(12) United States Patent
Liang

(10) Patent No.: US 8,465,355 B1
(45) Date of Patent: Jun. 18, 2013

(54) MULTIPLAYER ELECTRONIC WORD GAME

(76) Inventor: Steven Liang, New York, NY (US)

( * ) Notice: Subject to any disclaimer, the term of this patent is extended or adjusted under 35 U.S.C. 154(b) by 296 days.

(21) Appl. No.: 12/874,177

(22) Filed: Sep. 1, 2010

(51) Int. Cl.
*A63F 13/00* (2006.01)

(52) U.S. Cl.
USPC ............... 463/9; 463/10; 463/31; 463/42

(58) Field of Classification Search
USPC ............ 463/1, 7, 10–13, 16–21, 23, 25–27, 463/29–34, 9, 42; 273/138.1, 138.2, 139, 273/141 A, 142 B, 142 C, 142 J, 148 R, 430–431; 434/128, 322–323, 327, 332–334, 434/336, 341–362
IPC ............................................. A63F 13/00,13/10
See application file for complete search history.

(56) References Cited

U.S. PATENT DOCUMENTS

| | | | |
|---|---|---|---|
| 4,671,516 A | 6/1987 | Lizzola et al. | |
| 5,248,148 A | 9/1993 | Toan | |
| 5,441,277 A | 8/1995 | Lenhart et al. | |
| 5,657,992 A | 8/1997 | Bellizzi | |
| 5,921,864 A | 7/1999 | Walker et al. | |
| 6,198,904 B1 * | 3/2001 | Rosen | 434/307 R |
| 7,174,311 B1 * | 2/2007 | Galietti | 705/26.62 |
| 7,287,755 B1 | 10/2007 | Kershner | |
| 7,648,139 B1 | 1/2010 | Jean | |
| 7,695,357 B2 | 4/2010 | Fleury | |
| 7,908,324 B2 * | 3/2011 | Shochet et al. | 709/205 |
| 7,918,666 B1 * | 4/2011 | Lewolt | 434/322 |
| 2009/0280883 A1 * | 11/2009 | Haveson | 463/9 |
| 2012/0178073 A1 * | 7/2012 | Wasmund | 434/362 |

OTHER PUBLICATIONS http://www.discoverybaygames.com/product/literati-challenge Retrieved on Nov. 22, 2010.

* cited by examiner

*Primary Examiner* — James S McClellan

(57) ABSTRACT

A method and apparatus is provided for conducting a word game that is intended to be played by a plurality of participants though not necessarily at the same time or from the same location. The game may be played using one or a plurality of electronic client devices. One or more participants are assigned one or more words or phrases and tasked to create a work that includes text that should contain a predetermined number of the assigned words or phrases. Such work may also include other assigned materials such as images, moving images, other visual objects, audio pieces, other text or instructions. The participant(s) submit the work to a contest to be judged by other participants and also participate in judging contests containing the works of other participants.

18 Claims, 18 Drawing Sheets

Instructions: Please create a haiku similar in format to the haiku example

Haiku Example

As the wind does blow
Across the trees, I see the
Buds blooming in May

Words bazooka tornado influence

Your Haiku

Inspiration puppy love

Mulligan Words

Submit

FIG. 9

Instructions: Please vote for the haiku which you think is more creative

1320

As the wind does blow
Across the trees, I see
one plastic bag fluttering

| Words |
|---|
| plastic |
| tree |

| Inspiration |
|---|
| loneliness |

1322

Vote

1326

In a fall afternoon
the sound of a woodpecker
tapping

| Words |
|---|
| woodpecker |
| tap |

| Inspiration |
|---|
| hard work |

1324

Vote

FIG. 13

Creating a word set for a comic panel image contest category

Please enter a description of the theme

[                        ] 1520

☐ Public    ☐ Private
                1521

Please enter words to add to the set

[                        ]
                1522

[ Add to Word Set ]
              1524

Minimum Number of Words for Set: 50
                                      1530

Maximum Number of Words for Set: 250
                                       1532

Words  — 1526

Shakespeare
Romeo
Juliet
Hamlet
Macbeth
Shrew
sonnet
Anne Hathaway
King Lear
Merchant of Venice
soliloquy
Globe Theatre

[ Remove from Word Set ]
                          1528

FIG. 15

| Assigned regular word | Assigned combination word |
|---|---|
| race — 1820 | hard drive — 1830 |

| Example of legal usages | Example of legal usages |
|---|---|
| disgrace — 1822 | shard drive — 1832 |
| racers — 1824 | hard drivel — 1834 |
| racing — 1826 | shard drivel — 1836 |
| disgracing — 1828 | harddrive — 1838 |
| | sharddrivel — 1840 |
| | harder driving — 1842 |

FIG. 18

MULTIPLAYER ELECTRONIC WORD GAME

TECHNICAL FIELD

The present invention relates generally to multiplayer games for entertainment and education purposes. More particularly, the invention relates to multiplayer electronic word games.

BACKGROUND

Word games are universally enjoyed by people of various ages for both entertainment and education purposes. As a result, countless numbers of word games have been developed over the years and have resulted in different fundamental types of word games and many variations on those types of word games.

One type of word game is a letter arrangement game in which the objective of the game is to form a word on a playing surface from alphabet letters provided to a participant. The alphabet letters are provided to the participant, for example, by rolling one or more playing die having alphabet letters printed thereon or by selecting playing pieces from a plurality of tiles imprinted with alphabet letters. Typically, the letters are given different point values so that a "Word Score" may be determined and awarded to a participant based on the number of letters and the difficulty of the letters used to form the word. Word forming games of this variety are well known and are typically played with a plurality of players and include SCRABBLE™, BOGGLE™, and many variations of such games.

In addition, there are many word games that are played using an electronic device, such as a personal computer or mobile phone, and the concept of playing word games over a network such as the Internet is well-known. Additionally, many of these electronic and online word games are designed to allow for single player play.

Typically, in a single player electronic word game, the player is given a set of various alphabet letters and is tasked to form as many words as the player can within an allotted time period. The play is then scored on the number of words the player forms as well as the length of those words. These games are commonly described as taking scrambled letters and unscrambling them into words, and these games are also relatively well known. Examples of such games include BOOKWORM™ and TEXT TWIST™.

Another common type of electronic word game is a word search game in which the objective of the game is to search for already formed words within a scrambled grid of alphabet letters. These can also be seen in a non-electronic variety in word jumbles that can be found in daily newspapers of the past or present.

A vast majority of word games played on an electronic device, such as a computer or mobile phone, including those played on the Internet, are of the word forming or word searching variety. These word forming and word searching games utilize the established vocabulary of players. The word forming games also utilize the skill of the player in being able to take a scrambled set of alphabet letters and use at least some of them to form a word.

However, these types of games do not utilize the semantic meaning of the words. This limits the opportunity for a player to express creativity and engage more deeply in the language. Additionally, the educational value of such games is limited by the fact that the meaning and usage of the word is not a factor in the game. Using words in a semantic context could allow for such creativity, deeper language engagement and increased educational value.

While electronic word games having the objective of forming or searching for words are quite common, there are few electronic word games in which the semantic meaning of the word is a key component of the game.

Word games in which the semantic meaning of the word is important are typically party games that are played with a plurality of players together in one physical location, such as a group of friends playing in a room together. One type of game involves one or more players attempting to guess a given word or phrase as another player attempts to describe, draw or act out the word. Additionally, there may be constraints such as a list of words that may not be used while trying to get the other players to guess the particular word or phrase. Popular and well known forms of this type of game include TABOO™, CATCH PHRASE™, SCATTERGORIES™, PICTIONARY™ and charades. There are also other varieties of such semantic word party games such as guessing the dictionary definition of the word, as seen in BALDERDASH™, and word association games such as the one disclosed in U.S. Pat. No. 7,648,139.

One particular form of a semantic word game is one in which a player is assigned one or more words and is required to use the assigned words in creating a sentence or text. The players may also be given a theme or scenario in which to direct the usage of the words in the creation of the sentence or text. Scoring is typically based in some way on the other players' reading of or reaction to the created sentence or text. Examples of this form of game include LITERATI CHALLENGE™ and SPINERGY™ (as disclosed in U.S. Pat. No. 7,287,755). A variation of this is where a player is given certain a certain word and must create a text in which the last word rhymes with the given word, according to a given theme, for example, as seen in U.S. Pat. No. 5,441,277 and U.S. Pat. No. 5,248,148.

This form is based on a technique that is sometimes referred to as "constrained writing" in which the participant writes a sentence or block of text but is given certain constraints, such as certain words that must be used.

This form of constrained writing, in which a participant must use one or more words in creating a sentence or text has particular educational value because the participant may be forced to use a word that he or she does not commonly use or even understand. The participant may then gain knowledge about the semantics of the word through such usage.

The commonality among all the semantic word games described above are that they are usually played in a group of 4 or more players that are together in the same room. This makes for an entertaining environment; however, it can be difficult logistically to gather a group together at the same time in the same location and have all players commit a length of time (usually at least an hour) in order to play the game.

There are very few types of games which a player can individually play from a remote location, such as on a personal computer or mobile phone, and the semantic meaning of the word is important in the game. Generally, any exceptions, such as crossword puzzles, while utilizing the semantic meaning of the word, are limited in terms of allowing creativity and expression by the player since there is a defined "correct" answer or solution. There exists at the current time, a web site at the url address of http://www.quadrivialquandary.com in which participants are challenged to create a single sentence that contains all four words from a daily selection of words. The words are generally very difficult, archaic or infrequently used words. However, a participant only posts the sentence that he creates in a forum and there is no game structure, scoring or judging process.

There exists a need for a multiplayer word game in which (i) the semantic meaning of the word is important, (ii) the game possesses a creative element in which there is no defined "correct" solution, and (iii) the players can participate without the need to play at the same time or be in the same location as other players.

Additionally, a need exists for such a word game wherein the level of difficulty or the category or theme of the words or phrases can be varied to accommodate a broad range of skill levels, interests, knowledge and vocabularies.

Furthermore, a need exists for such a word game to include a persistent account for each player in order to track statistics, game progress and other game related information for the player and is used in an overarching game structure in order to motivate players to compete and collaborate with friends and other players and also to unlock further aspects of the game.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention provides a method and an apparatus for conducting a word game that is intended to be played by a plurality of players though not necessarily at the same time or from the same location.

The present invention overcomes disadvantages of prior art online word games by providing a novel method of playing a word game in which the meaning of the words or phrases used are an important factor in the game and allows the player to express more creativity and improvisation within the parameters of the game. It overcomes disadvantages of traditional word games and party games by allowing the player to play at the player's convenience from a remote location and not necessarily at the same time as other players, providing for a persistent player account to track the player's game progress and statistics, and offering a large and dynamic variety of words and other game elements to accommodate a broad range of skill levels, interests, knowledge and vocabularies.

In one embodiment, the game is played by many players whom connect to a network, such as the Internet, from remote locations using an electronic client device. Players access and interact with the elements of the game such as the words, images, other materials, created works and contests through the network by connecting to servers which contain databases storing such information. The electronic client device may include a client computer, mobile phone or other device which may possess a display screen, an input means to input or select text, and a device that permits access to the network.

The players of the game do not have to be simultaneously connected to the network, but only when each player is individually playing the game and performing actions within the game. Such asynchronous yet persistent game play allows the player to play more at the player's own pace according to the player's individual schedule.

Each player may have a persistent account associated with that player stored in a database on a server which can keep track of the player's statistics, past and current works and contests, virtual items, in-game currency and any other relevant information to that player's account. In one aspect, the game could be played in connection with the player's account on a social network to utilize the player's existing social connections on the social network.

In another embodiment, the game is played by players whom are simultaneously connected to the network and the game play would occur in a more real time fashion. Players would create works which would then be judged by other players whom are also connected to the network at that same time. Additionally, players may collaborate to create works with other players whom are also connected to the network at that same time.

In yet another embodiment, the game is played by a group of players playing from the same location and would use one or more electronic client devices to play the game in a real time fashion similar to a traditional party game.

In one game play aspect, the game comprises a variety of contest categories which the player may participate in. The player either selects or may be assigned a contest category and then the player may participate in the contest category by (a) creating works to be submitted to a contest and judged by other players and (b) judging contests which contain works created by other players.

The works that are to be created by the player involve the player being assigned one or more words or phrases, of which the player must use a certain number of the assigned words or phrases in creating one or more texts for the work. Note that herein the usage of "word" or "words" is to be construed broadly and may include phrases as well unless noted otherwise. Depending on the contest category, there may also be assigned to the player one or more (i) images, moving images or other visual objects, (ii) audio pieces, (iii) inspiration words, (iv) other text, (v) instructions, or (vi) some combination of the aforementioned. Typically, these additional materials are connected in some way to the text(s) that the player is creating. Such player created text(s) along with any of the aforementioned accompanying materials will be herein referred to as a "work" or "submission". There may also be works that involve the collaboration of two or more players in the creation of the work.

Each contest category has a contest format which defines the parameters involved in the creation of the work as well as other variables for the contest such as how contests are judged, how long contests last, and what the possible rewards that may be received from the contest are.

Typically, besides the assigned words to be used in the creation of the work, the contest format will provide for at least one additional accompanying material in order to provide some direction and context to the player for creating the text(s).

The words, images, moving images, audio pieces, text, instructions, and other materials involved in the creation of the work can be organized and stored in a database on a server. The game can retrieve such materials from the database and assign such materials to the player. In an alternative embodiment, such materials may be stored in the client device.

After a player creates a work according to the format of the contest category, the player may submit the work to be entered into a contest. The work will first be verified that the text(s) contain the requisite number of assigned words or phrases. Some contest categories may require the player to create multiple individual works and then choose one of those works to submit. Upon submission to a contest, the work is available to be judged by other players. This may be by rating the work individually or placing the work in comparison with other works created by other players and receiving votes or points from judging players. Typically, the contest would be active and available for judging for a limited amount of time.

After the period of time in which the contest is active and open to judging, the player can view the final results of the contest and may receive experience points, in-game currency, achievements and/or other rewards based on the final results of the contest. The final result may, for example, be its rating score or the number of votes out of the total number of votes it received. Additionally, other factors, such as the number of assigned words used beyond the required number of assigned words, may influence the amount of rewards to be received. When the contest is over, the work may be available for the player to view and to be displayed to the player's friends or other players in that player's gallery. The gallery is a collection of past works intended to be viewed by the player and others.

Additionally, before the player can submit a work to be entered in a contest and judged by other players, the player may first be required to judge a certain number of contests within that contest category. Requiring players to judge contests before being able to submit a work to a contest helps to maintain an active base of players judging contests.

BRIEF DESCRIPTION OF THE DRAWINGS

FIG. 9 is an illustration of a display for creating a work, in which the player is assigned words and an inspiration word and is given instructions to create a haiku, according to one embodiment of the present invention.

FIG. 13 is an illustration of a display for a player voting on one of two works in which each player was given instructions to create a haiku and given an inspiration word, according to one embodiment of the present invention.

FIG. 15 is an illustration of a display for a player creating a set of words for a custom contest category, according to one embodiment of the present invention.

FIG. 18 is a chart of various examples of legal usages of an assigned word.

DETAILED DESCRIPTION

The present invention provides a method and an apparatus for conducting a word game that is intended to be played by a plurality of players though not necessarily at the same time or from the same location.

Figure 1:
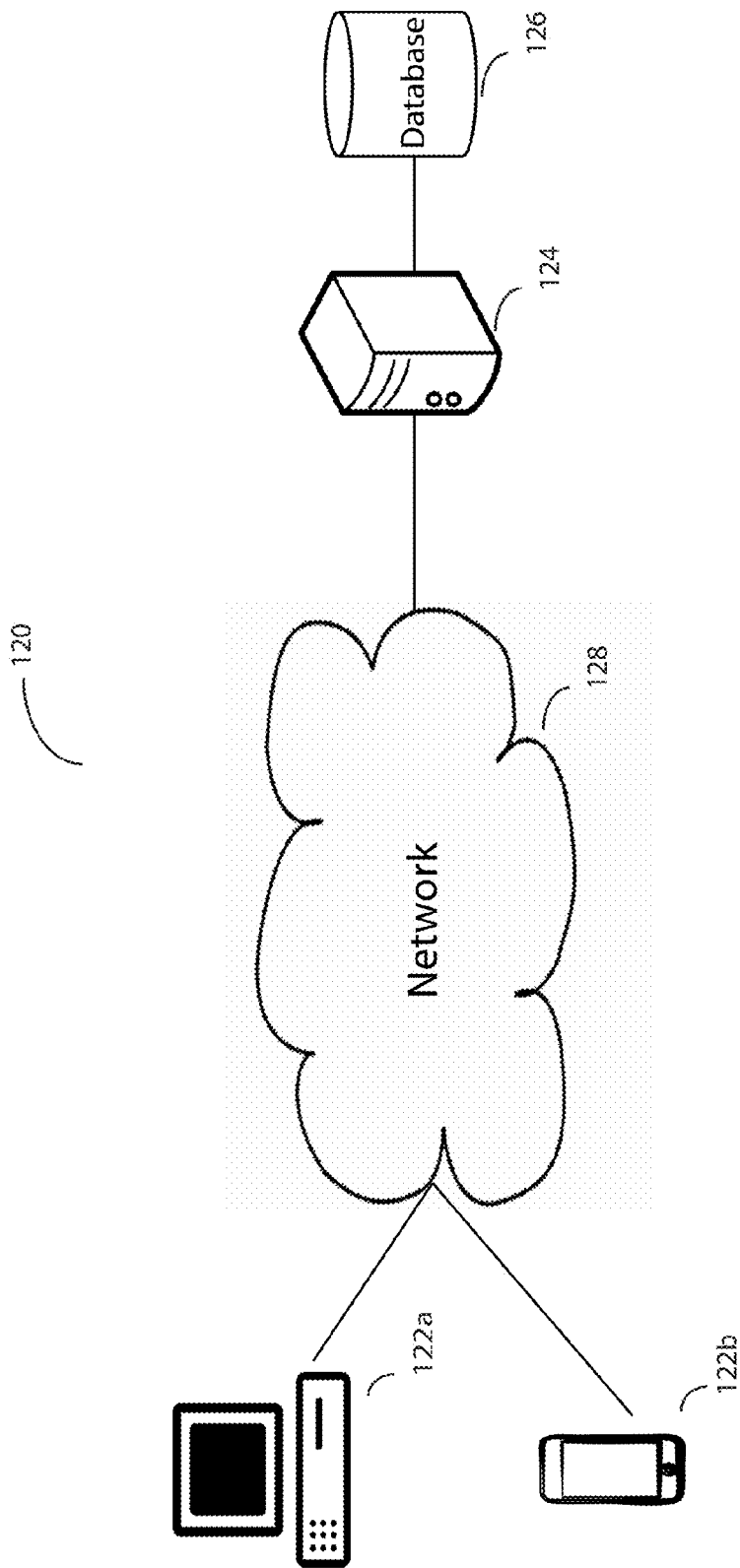
FIG. 1 is a block diagram of the physical components or apparatus for enabling a player to play a word game using a networked electronic client device, according to one embodiment of the present invention.

Referring to FIG. 1, according to a one embodiment of the invention, the game is played through the use of a system 120. The physical components of the system include one or more electronic client devices 122a 122b that are connected to one or more servers 124 which include one or more databases, such as a relational database 126, which store various data used in the operation of the game. The electronic client device connects to the server via a network 128 such as the Internet and sends and receives information through the network. The electronic client device may include a client computer 122a, mobile phone 122b or other device which may possess a display screen, an input device which can input or select text and a device that permits access to the network. The electronic client device may further comprise typical, well known computer system components such as a keyboard, mouse, microprocessor, memory and persistent storage device. The server may include well known components of a server computer, such as one or more processors, memory, persistent storage devices and databases, such as a relational database. The software code to conduct the game may be stored and executed on either of or both the electronic client device and the server. Ideally, the software code to write any information to the database would reside and be executed on the server in order to maintain security and data integrity.

In one embodiment, the game is played by a plurality of players that access the game individually at each player's convenience. The players are not required to be simultaneously playing the game nor in the same proximate physical location when playing. Instead, each player can log in and play, in an asynchronous fashion, at each player's convenience and from a separate, remote location.

In another embodiment, players may be playing from remote locations but the game play would occur in a more real time fashion with other players whom are playing via the network at the same time. Players would create works which would be judged by other players whom are connected to the network and playing at the same time. Players may also collaborate to create works with other players whom are also connected to the network and playing at the same time.

In yet another embodiment, there may be a group of players playing from the same location and would use one or more electronic client devices to play the game in a real time fashion similar to a traditional party game. In this embodiment, the electronic client device may be connected to a network to access certain game elements from a remote source, such as a server. In another embodiment, the electronic client device may contain all the game elements and functionality within itself. If multiple electronic client devices were used, these devices could connect with each other through a network in order to facilitate the exchange of game information between the devices.

In a preferred embodiment, the game maintains a persistent account for each player, which can reside in the database(s) 126 on the server(s) 124. The account can comprise of information related to that individual player such as the player's user account information, statistics, works, contest results, friend connections, virtual items, in-game currency, and other game related information for that player.

Examples of statistics that may be stored in the database may include both a player's overall average rating as well as the player's average rating for each contest category and both the total number of contests participated in as well as the number of contests participated in for each contest category. An overall skill rating score may also be computed based on that player's contest results and statistics. Other statistics based on a player's judging record may also be stored, such as the total number of contests a player has judged as well as the number of contests judged for each contest category and the average rating that the player gives while judging works.

In one embodiment, each player could have a level associated with the player's account, beginning at level 1, and would gain experience points and increase the player's level as the player continues to play the game. Experience points could be awarded at the conclusion of each of the player's contests.

Additionally, each player could possess in-game currency, such as coins for example, that could be acquired in the game. In-game currency could be acquired as a reward at the conclusion of a player's contests, for judging a contest, for reaching certain achievements, for performing social actions such as viewing a friend's gallery or active contest, through purchase using real world currency, or in exchange for performing an action outside the game such as, watching an advertisement video for example. This in-game currency may be used in a variety of ways in the game, several of which are detailed further below.

In one embodiment, there may also be a second in-game currency that may only be purchased using real world currency or in exchange for certain actions outside the game (such as watching an advertisement video). This second in-game currency may be used for additional features or virtual items that may not be available for the first in-game currency.

Figure 2:
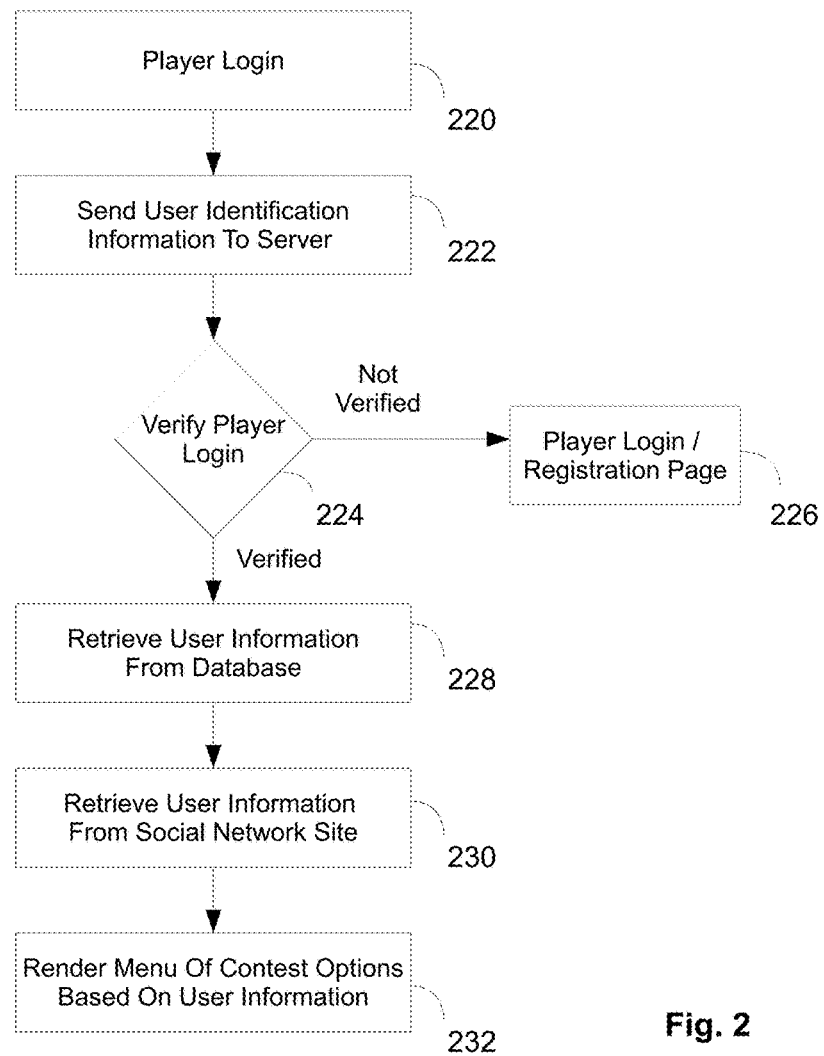
FIG. 2 is a flow chart that illustrates a method, in accordance with one embodiment of the present invention, of a player logging in to the game.

Referring to FIG. 2, a player initially will log into the player's account 220. This could be done either through a social network site, through an external web site, or through some other means. The login information, typically the player's identification and password, are sent from the electronic client device to the server through the network 222. The server will then verify if the player identification and password is a correct match by looking it up in the database 224. If the player is playing through a social network site, then the player may already be logged in to that social network and this player identification and password verification step may not be necessary. If the player identification and password combination is not a correct match, then the player could be sent to a screen offering another opportunity to login or to register for an account 226. If the player identification and password combination is a correct match, then the player's account information is retrieved from the relevant database 228. If the player's account is connected to a social networking site, then that player's information from the social networking site is also retrieved 230.

The menus of the various contest categories could then be rendered for the player, based on that player's account information 232. In order to render the menus of the contest categories, the software looks at the player's account information to determine what contest categories the player has access to and where in the contest process the player is for each of those contest categories.

In a database, each player's account may have fields related to each contest category. This may include whether the player has access to that category and if so, where in the contest process the player is for that category. There also may be stored specific statistics for that category such as average rating or contest result, total contests participated in, and total contests judged. Retrieving that information and rendering the menus for the player could be done when the player logs in so that the menu of available contest categories and options is available at start of the game play. Alternatively, retrieving the information and rendering the menus may be done more dynamically each time the player selects to enter into a new menu.

Figure 3:
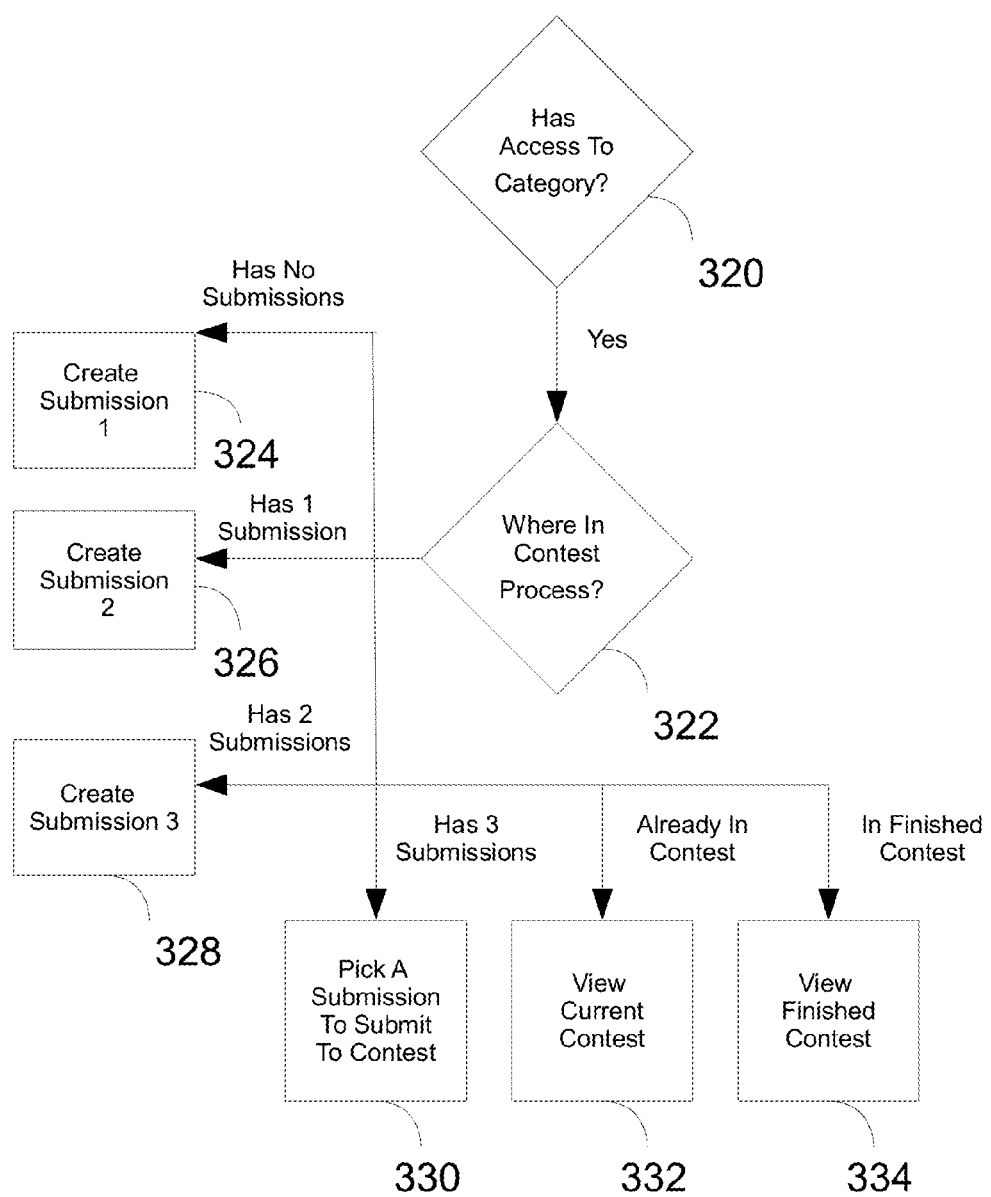
FIG. 3 is a flow chart that illustrates a method, in accordance with one embodiment of the present invention, of using a player's account information in relation to a particular contest category in order to determine the "next step" menu option for that contest category.

Referring to FIG. 3, is a method to determine where a player is in the contest process for a particular contest category. The contest format for this particular contest category requires a player to first create three separate work submissions and then choose one of the three to submit to a contest.

First, it is determined if a player has access to a particular contest category 320. If the player has access, then it is determined where in the contest process that player is for that contest category 322. The possibilities for where in the contest process a player is comprises of the following: a player may (i) have no submissions and the next step would be to create submission number one 324, (ii) have one submission and the next step would be to create submission number two 326, (iii) have two submissions and the next step would be to create submission number three 328, (iv) have three submissions and the next step would be to pick one of the three to submit to a contest 330, (v) already be in an active contest and the next step would be to wait for the contest to conclude and the player can view the contest in the meantime 332, or (vi) already be in a contest that has finished and the next step would be to view and close out the finished contest 334. Whichever of the aforementioned possibilities is the applicable one is herein referred to as the "next step" for that contest category.

Additionally, a player may be required to judge a certain number of times more in a particular contest category before the player is allowed to create a submission or submit a work for that contest category. Also additionally, a player may not be able to submit a work to a contest because the player does not have any more available slots to create an active contest. The player would then either need to acquire more slots or wait for a current contest to conclude and for the slot to become available again.

The above information is processed for each contest category. This can then be rendered in one or several menus in which the available contest categories and the options that a player has for those contest categories is displayed to the player.

Figure 4:
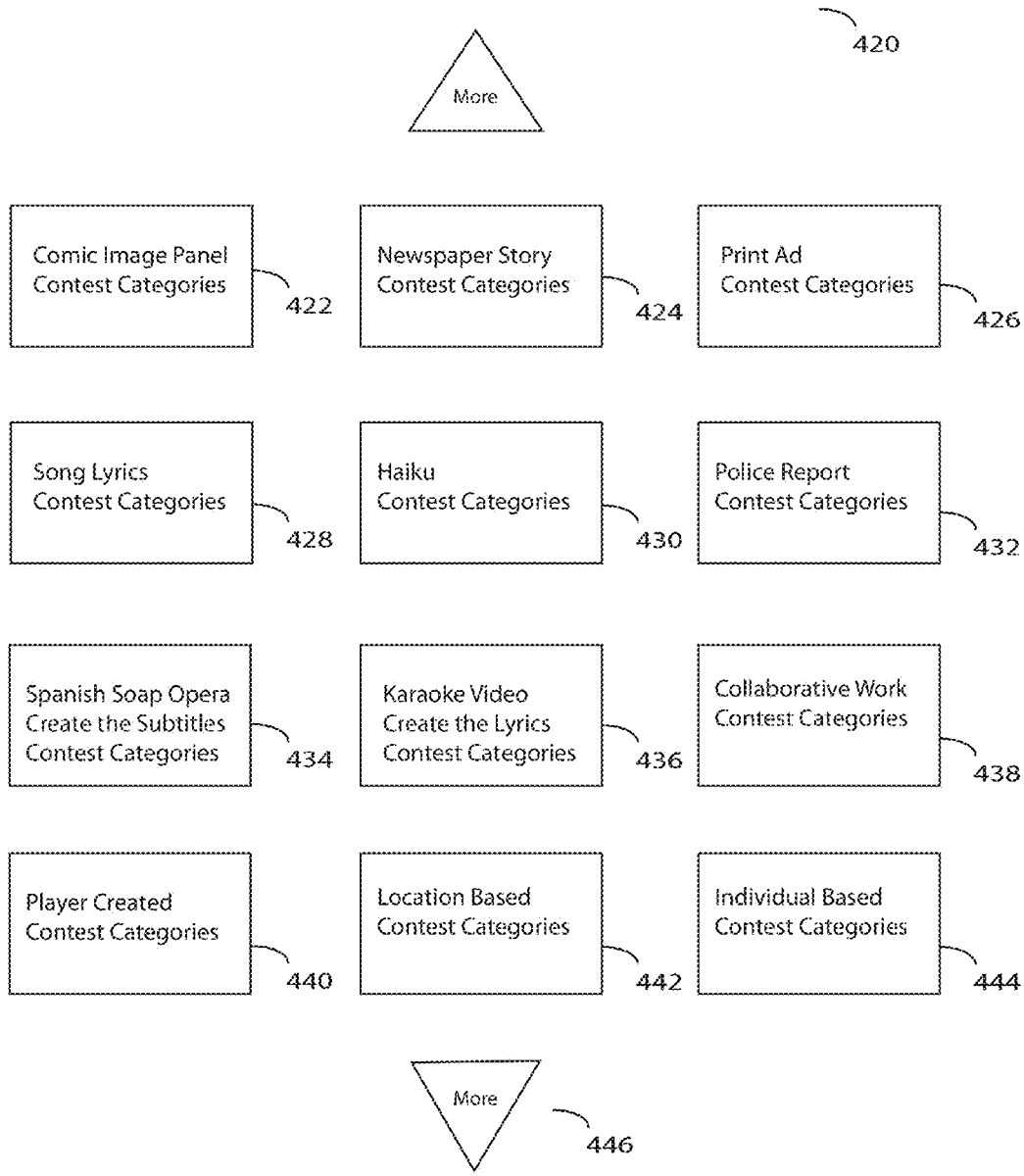
FIG. 4 is an illustration of a sample menu display of different types of contest categories, according to one embodiment of the present invention.

Referring to FIG. 4, in one embodiment, there is a sample first menu. This first menu comprises of different types of contest categories based on which additional materials are assigned for the work 420. In this sample first menu, the types of contest categories displayed are contest formats in which a) there is assigned a comic panel image 422, b) there is assigned a photo and instructions to create a news headline and abstract for it 424, c) there is assigned an image or photo with space for text, an inspiration word and instructions to create a print advertisement 426, d) there is assigned a first stanza of lyrics and instructions to create the next stanza 428, e) there is assigned an inspiration word and instructions to create a haiku 430, f) there is assigned an image of a crime scene and instructions to create a police report 432, g) there is assigned a video clip of a foreign language soap opera and instructions to create the subtitles 434, h) there is assigned a music video, instrumental music audio and instructions to create the sing along lyrics for karaoke 436, i) the works involve multiple collaborators in its creation, which is explained further below, j) they are player created contest categories, which are explained further below 440, k) they are location based contest categories, which are explained further below 442 and l) they are individual based contest categories, which are explained further below 444. There is a button which allows a player to scroll through other types of contest categories if more are available than can fit on the display screen 446. It can be appreciated that this is one depiction of a menu of different types of contest categories and other types of contest categories are or may be made available to players as well as other methods of organizing the menu and the contest categories.

The player can select a type of contest category and would then be taken to a second menu which would display all the available contest categories for that type of contest category. The available contest categories in the second menu would generally differ from each other based on the set of words or phrases from which the assigned words or phrases are drawn.

Figure 5:
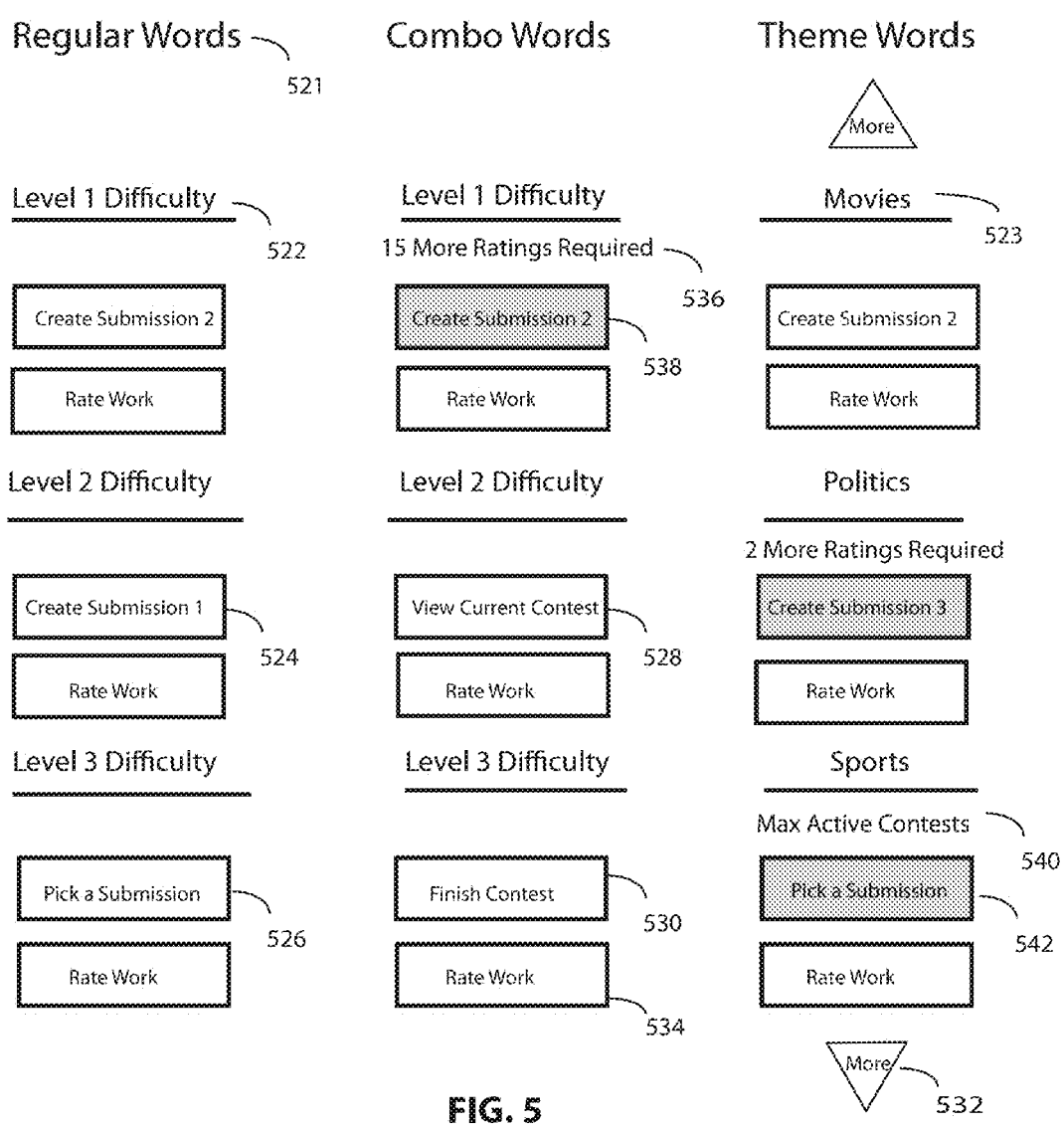
FIG. 5 is an illustration of a sample menu display of different contest categories for a particular type of contest category, rendered for a particular individual player, according to one embodiment of the present invention.

Referring to FIG. 5, is a sample second menu for the various contest categories in which a comic panel image is assigned 520. There are different contest categories for the different sets of words or phrases from which to draw the assigned word(s) or phrase(s). These can be organized under headings for the type of word such as, in this example, "Regular Words" 521, "Combo Words" and "Theme Words".

For each type of word, there are further contest category differentiations based on difficulty level 522 or theme 523. Each contest category has a button or some other means to allow the player to select to take the next step. This next step may be to create a submission (and it is also indicated which submission number it would be) 524, pick a submission to submit to a contest 526, view the current contest 528 or finish the current contest if its active time for being judged is over 530. There is a button which allows a player to scroll through other contest categories if more are available than can fit on the display screen 532.

Additionally, each contest category also has a button to allow the player to select to judge an active contest from that category 534. For these particular contest categories, the judging process is by rating an individual work in a contest so the buttons are labeled "Rate Work".

If the player needs to judge more contests before being allowed to take the next step, this can be indicated to the player in the menu 536 and also the button to select to take the next step could be disabled or grayed out 538.

If the player does not have an available slot to submit a work and enter in a contest, this can be indicated to the player in the menu 540 and also the button to select to pick a submission to submit to a contest could be disabled or grayed out 542.

Creating a Work

Figure 7:
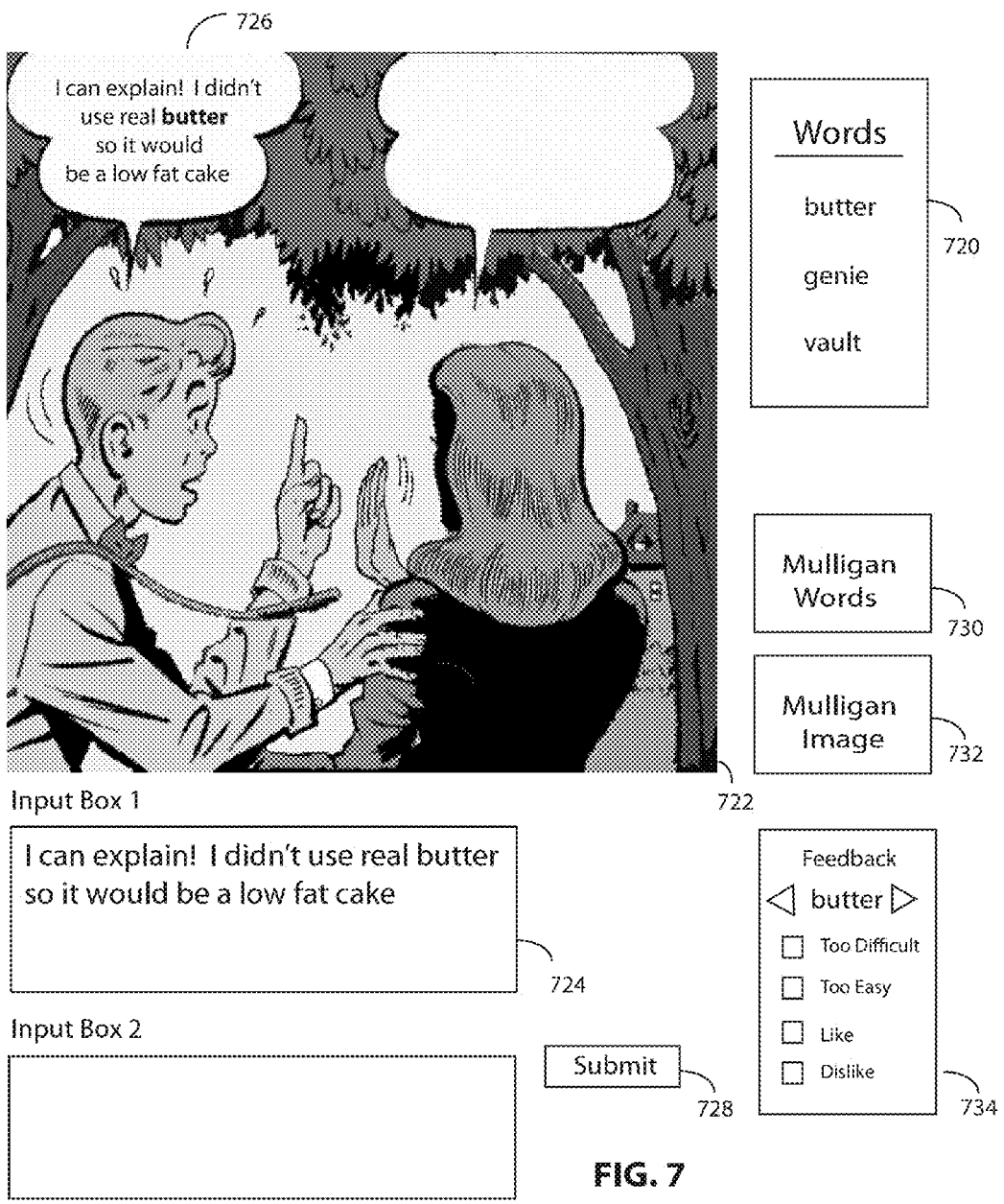
FIG. 7 is an illustration of a display for creating a work, in which the player is assigned words and a comic panel image and tasked to create the text for the work, according to one embodiment of the present invention.

Referring to FIG. 7, if the player selects to create a work submission, the player is taken to a screen displayed on the electronic client device in which the player is shown the assigned word(s) or phrase(s) 720 and can create text(s) in the input box 724. In another format, the player may create the text by typing or inputting text directly into the relevant area in connection with the image (the comic text bubbles in this case) instead of an input box. Depending on the format of the contest category, there may also be one or more associated images, moving images, other visual objects, audio pieces, other texts or instructions that are assigned and displayed on the electronic client device. Typically, these additional materials are related to the text(s) to be created by the player. In this particular contest category, an image of a comic panel is assigned and displayed 722.

Figure 8:
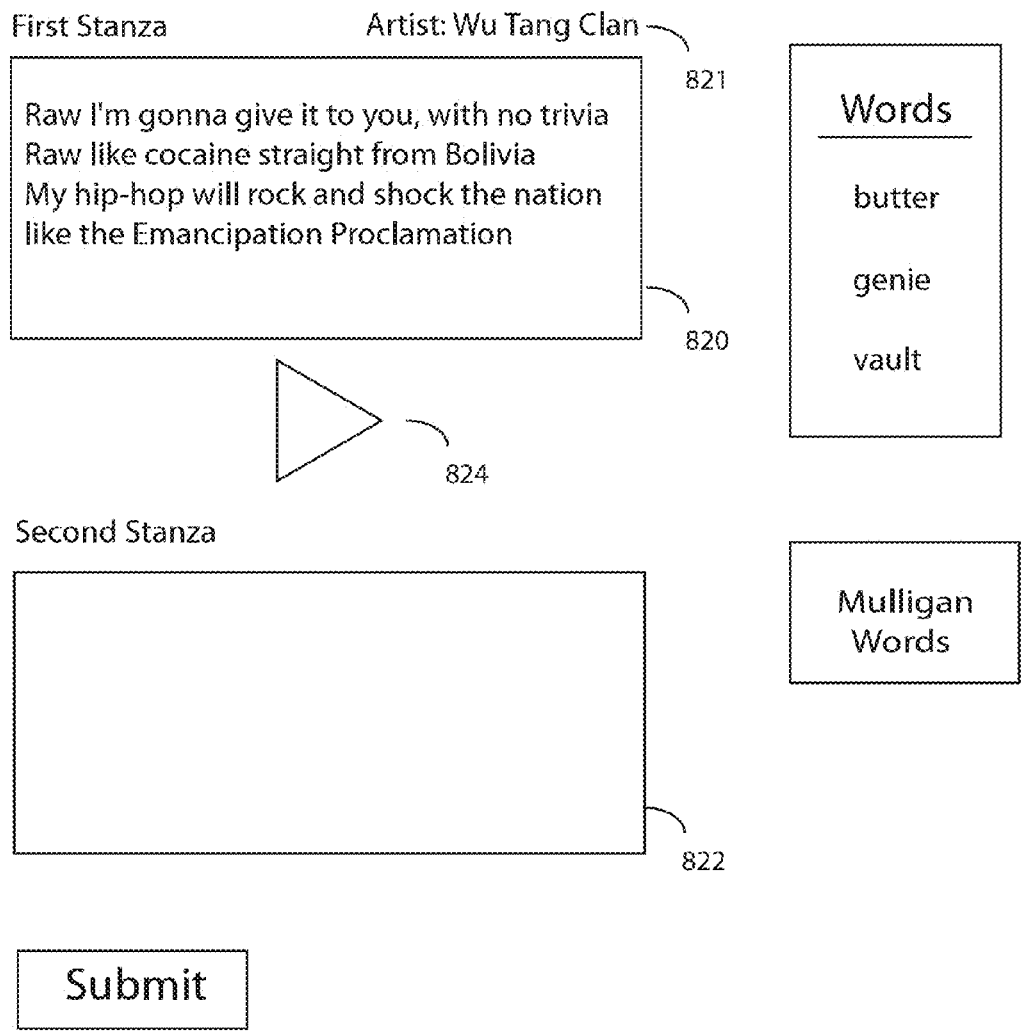
FIG. 8 is an illustration of a display for creating a work, in which the player is assigned words and a first stanza of rap lyrics and tasked to create the second stanza, according to one embodiment of the present invention.

Referring to FIG. 8, text is assigned and displayed in the form of a first stanza of rap music lyrics 820 and the player is asked to create text in the form of the second stanza in the input box 822. The artist of the first stanza may also be displayed 821. There may also be an audio clip of the first stanza that may be played on the player's device 824.

Referring to FIG. 9, instructions to create a haiku 920 as well as a haiku example 922 are displayed. Additionally, an inspiration word is assigned and displayed 926. Inspiration words are explained further below. The player is asked to create a haiku by inputting the text in the input box 924.

Additionally, in certain contest formats, it is contemplated that the player created text may be inputted by the player by conveying the text in an audio format as opposed to a written format, which may then be transcribed to a written format. Also, in certain contest formats, it is contemplated that there may be a time limit for the creation of the text by the player.

Figure 6:
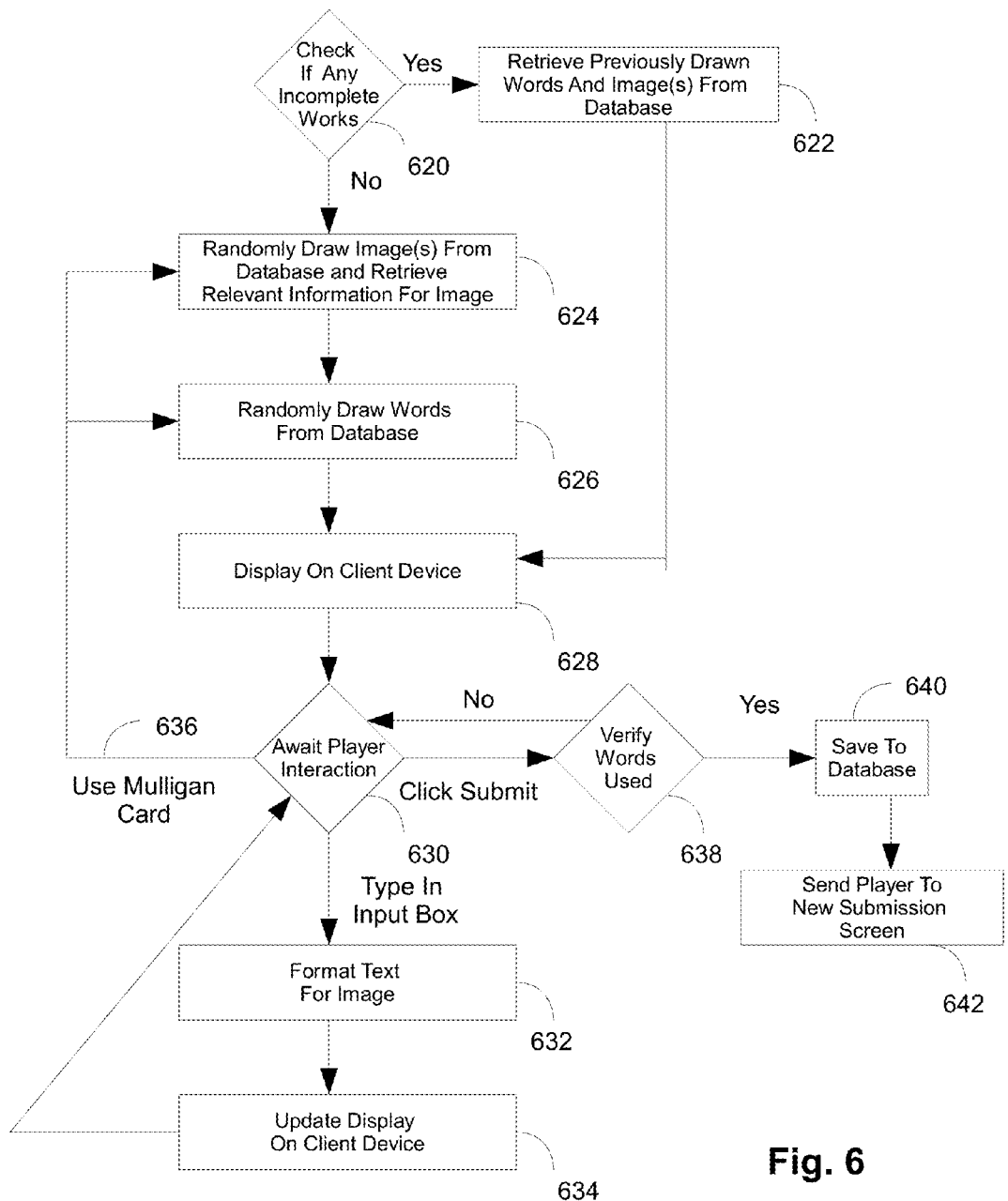
FIG. 6 is a flow chart that illustrates a method, in accordance with one embodiment of the present invention, of a player creating a work in which an image is also assigned.

Referring to FIG. 6, for a particular contest category in which there are words and images that are randomly assigned to the player, when the player first selects to create a work, the software will determine if the player had attempted to create a work before in that contest category and never completed the work 620. This may be done by searching the database to find any incomplete works started by that player for that contest category. If there is, then the incomplete work along with the words and images that have already been assigned to the player are retrieved and displayed 622. If not, then based on the contest format, one or more words 624 and one or more images 626 from the particular set of words and images defined by the contest category are randomly drawn from the database. They are also saved to the database in association with an incomplete work tied to the player's account, in case the player quits before completing the submission. The word(s) and image(s) are then displayed to the player on the electronic client device 628. In the case for images, information related to the images such as formatting information may also be retrieved 624.

At this point, the game waits for player interaction in order to move forward 630. The player may type text into an input box to create the text for the work. As the user types in the input box, the text may automatically be formatted and inserted into the relevant area in connection with the image 632. The software could do this by using information about the specific image such as the available text space within the image as well as information about the font being used. For example, for a comic panel, the text would appear in the text bubble as the user types and the text is automatically conformed to fit within the text bubble. This could be done by using specific information such as the coordinates, shape and size of the text bubble in relation to the image as well as specific information relating to the font characteristics such as its size and weight. Every time the player enters or deletes a character or pastes in a series of characters, the text can adjust to best conform to the text bubble and image and update on the display 634. For example, for a work which includes a comic panel, the text would be centered as much as possible, both horizontally and vertically, in the middle of the text bubble and there would be word wrapping so that lines would break between words and not within words. Additionally, any required words that are used by the player could appear bolded in the text bubble 726.

The player may choose to use a mulligan card 636, which is used to redraw the assigned words or other assigned materials. For example, on the player's display, the player may select "mulligan words" 730, which would redraw the assigned words, or "mulligan image" 732, which would redraw the assigned image. These mulligan cards could be acquired using in-game currency and are used up and removed from the player's account when the player uses one. Additionally, mulligan cards may be awarded to players for increasing in level, for other achievements or gifted from another player. In one embodiment, mulligan cards may only be purchased using the second in-game currency and is not available for purchase using the first in-game currency.

There may be included the option for the player to provide feedback on the difficulty of or the appropriateness for a theme for assigned words and other materials. This can be done by providing check boxes for various feedback options for each assigned word or material and an interface in which the player can scroll through all the assigned words 734. For example, a player may have the option to provide feedback that an assigned word, which was for a contest format in which the words were denoted as being a difficulty level of 1, was too difficult for that level. In another example, a player may have the option to provide feedback that an assigned word, which was for a contest format in which the words were denoted as being related to movies, was not seen as relevant to that theme. In one embodiment, the player may have the option to provide feedback that an assigned word or other material was too difficult, too easy or irrelevant to the theme and additionally, whether the player liked or disliked it. When the player submits the work, any check boxes indicating feedback from the player would update the relevant fields associated with those words in the database. This information could be aggregated and tracked in order to dynamically adjust the sets of words and other materials. For example, if a word were consistently rated as too difficult, it may be moved into a higher difficulty level set of words.

When the player is satisfied with the text(s) that the player has created, the player may click a button or use some other means to submit the work 728. The game will verify that the required number of assigned words or phrases was used in a legal form in the available input boxes 638. Each contest format requires that the player use a certain number, at least one, of the assigned words or phrases. Additionally, the player may use more assigned words or phrases than is required of the player in order to score more points or for greater rewards from the contest.

If the requisite number of assigned words or phrases were used, then the work is saved in the relevant database and denoted as a completed work 640. In one embodiment, this could simply be to take the incomplete work saved earlier and updating it with the text(s) created by the player as well as any additional information and changing its status from an incomplete work to a completed work. The text that is saved is the formatted text that was conformed to fit the image. This is so the text is already formatted when retrieved and displayed again to the player or other players.

A new submission screen will then be displayed to the player on the player's electronic client device 642. Before this new submission screen is displayed, any previous submissions for that contest category are retrieved from the database.

Figure 10:
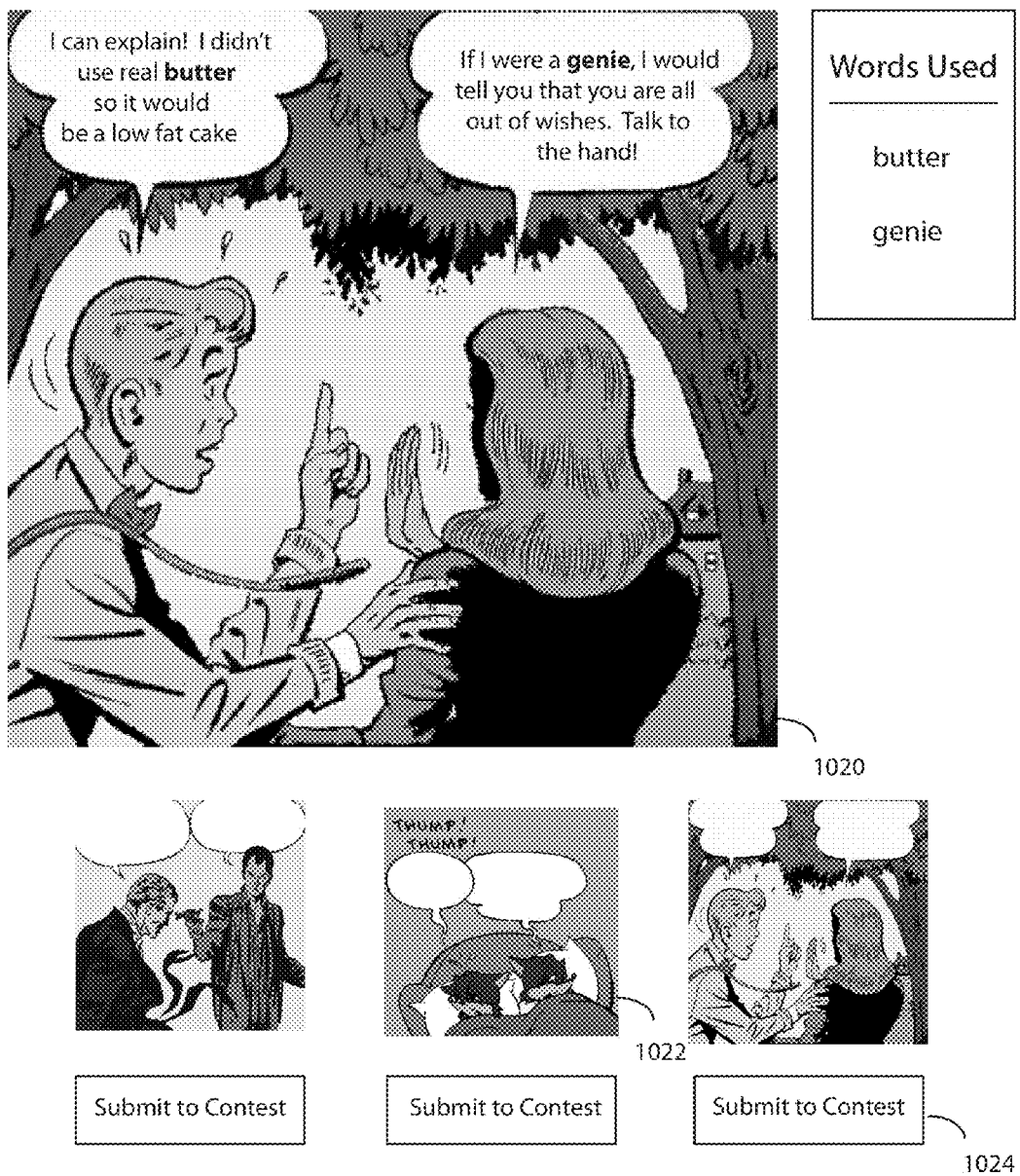
FIG. 10 is an illustration of a new submission display after a player creates a work submission, in which the contest format requires the player to create three submissions before picking one to be submitted to a contest, according to one embodiment of the present invention.

Referring to FIG. 10, is a new submission screen shown on the player's client device display where the player is shown the just created work in the full size image canvas 1020 as well as preview images of any previous submissions 1022. If the player clicks on a preview image, then that work would be shown in the full size image canvas. If the player has created three submissions, then the player may pick one of the three submissions to submit to a contest 1024. If the player selects to submit a submission to a contest, then the other submissions would be deleted from the database and an active contest could then be created for the submitted work.

In the case of a voting contest between two or more works, works created by other players for that contest category that are not yet in a contest would be retrieved from the database. There would be a preference for works created by players of a similar level to the current player. If there are not enough available other works to fill a contest at that time, then the work may instead be placed in a waiting list to be put in a new contest.

If an active contest is created, then the active contest becomes available in a database to be retrieved when another player selects to judge that contest category. Typically, the contest is active and available for judging by other players for a limited period of time defined by the contest category. In one aspect, all contests for a particular contest category would have the same period of time. This contest period could be set at somewhere between a few hours to several days. One key factor as to how long the contest period could be is the average number of and frequency of players that participate in and judge contests in that particular contest category. The larger that number is, then the shorter the contest period can be yet still be judged a meaningful number of times. In another aspect, the player may be able to choose between a selection of different time periods for how long the contest will last.

Judging Contests

In one embodiment, there are two main types of contests and judging mechanics, by either rating a work individually or by voting between two or more works as to which one the judging player prefers. The form of judging would be determined by the contest format of the particular contest category.

Figure 12:
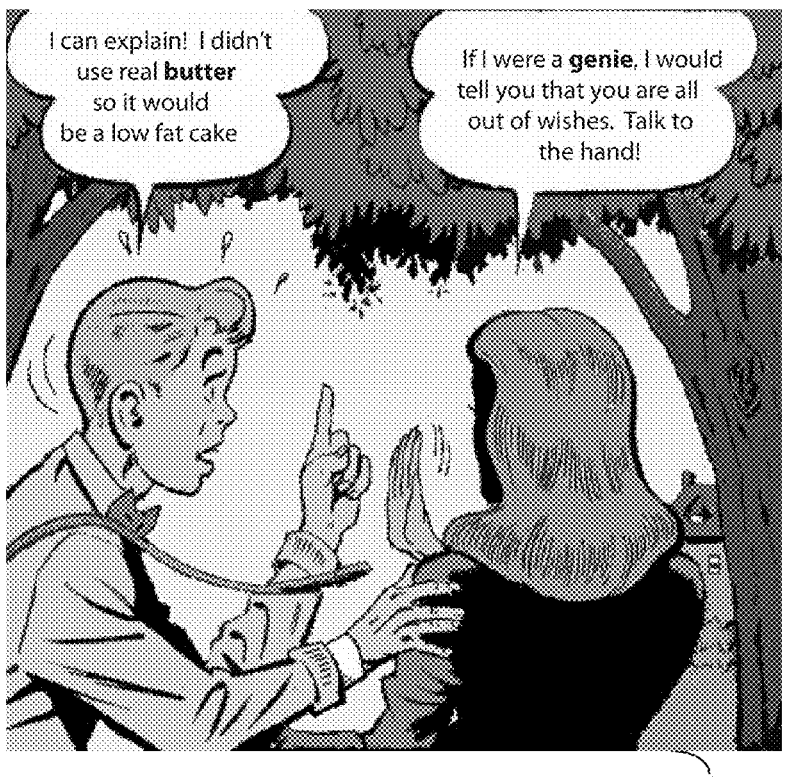
FIG. 12 is an illustration of a display for a player rating a work with a comic panel image, according to one embodiment of the present invention.

Referring to FIG. 12, is an illustration of a display if the contest is judged by rating an individual work, herein referred to as a "rating contest". The rating can be a numerical based rating, letter grade based rating, some other form of scaled gradation or even a simple like or dislike selection. In one embodiment, the display would include five stars which the judging player selects and which correlates to a numerical rating from one to five 1222.

Referring to FIG. 13, is an illustration of a display if the contest is judged by voting for a work among a plurality of works, herein referred to as a "voting contest". For a voting contest, the works may be placed in conjunction or comparison with each other on the display 1322 1324. The voter may be given criteria for how to vote such as selecting the most humorous or most creative 1320. There is a selection mechanism such as a button to click for the player to select which work the player prefers 1326. It is also contemplated that instead of voting on one, a judging player may rank certain works or be allocated a number of award points, such as one hundred, and distribute it among the works as the judging player sees fit.

Figure 11:
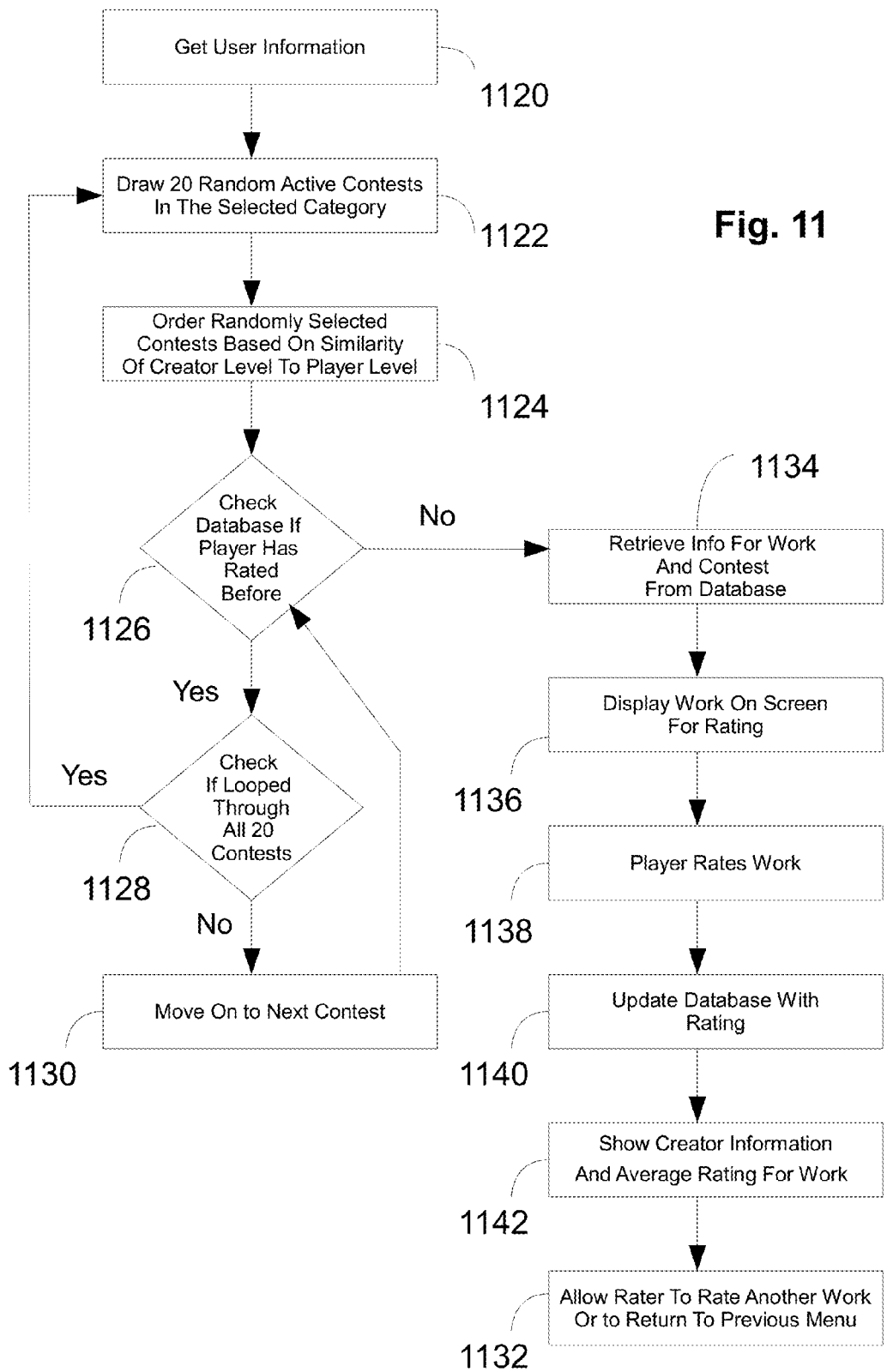
FIG. 11 is a flow chart that illustrates a method, in accordance with one embodiment of the present invention, after a player selects to rate a work for a particular contest category.

Referring to FIG. 11, when a player selects to judge a contest for a contest category (in this case, the format is a rating contest), a certain number, such as twenty, randomly selected active contests for that contest category are retrieved from the database 1122. Additionally, the level of the creator of the work for each of the active contests would also be retrieved.

These randomly selected active contests are then ordered based on how close the level of the creator of the work is to level of the judging player 1124. If there are multiple creators then the creator whose level is the greatest in difference from the judging player's level would be used. Then the software would begin with the contest in which the creator's level is closest to the judging player's level and check in a database whether the judging player has judged that contest before 1126 or if any of the creators is the same as the judging player. If so, then the software would move on the next contest in the ordering 1130. If the software has reached the end of the randomly selected contests and has not found a contest for the player to judge 1128, then the software would draw another set of randomly selected active contests to loop through again but which would not include any contests that have already been checked 1122. The software would continue to do this until either there are no more active contests left or a max loop number, such as fifty, is reached. If there are no more contests left to check or if no contest is found for the player to judge in those fifty loops, then the player would be informed there are no available contests to judge and to return to judge at a later time.

If the software has found a contest that the judging player has not judged before and is not the creator of the work, then the relevant information for the work and contest would be retrieved from the database 1134 and the work would be displayed on the player's device display 1136 along with an interface for the player to input or select a rating 1222. The player can then rate the work 1138 and the rating would be recorded in the database for that contest 1140. Information for the creator(s) of the work 1224 as well as the average rating that the work has received thus far 1226 would then be shown to the judging player 1142. The judging player would then have the option to continue and rate a different contest from that contest category or return to the previous menu 1132.

Each rating or judgment could be saved in the database and comprise a unique judgment identification number, contest identification number, creator(s) identification number, judging player identification number, the rating or judgment and any flags raised by judging player.

A player's level is used in determining what works a player will judge as well as what other players will judge that player's works. So if a player is of a higher level, then that player can be reasonably assured that when he or she is judging works, the player who created those works is of a similar high level and thus probably has more experience with the game than a lower level player. Along the same lines, that player can be reasonably assured that the other players whom are judging that player's works are of a similar high level to the player. This provides an incentive for more sophisticated or serious players to invest their time in raising their level and allows for some separation between the more active and experienced players and the new players whom may not have a grasp of the game or are not taking the game quite as seriously.

In order to maintain an active base of players whom are judging works, a player may be required to judge a certain number of contests in that contest category before the player can create a work. For example, a player may need to judge ten contests before creating a work.

The player has the option to judge contests beyond the required number of times and there may be incentives such additional experience points, in-game currency, or in-game perks or items for judging beyond the required number of times. In one embodiment, every time a player judges a work, there is a small chance, such as 10% for example, that the player receive a small amount of experience points or in-game currency. This additional amount of experience points or in-game currency that the player can receive from judging works could be capped at a certain maximum amount per day.

In another embodiment, instead of requiring a player to judge a certain number of contests before entering, a player could earn in-game currency by judging contests and there would be an in-game currency entry fee to create works and enter contests. Ideally, the amount of in-game currency that could be earned judging contests would be limited to a maximum amount per day.

While judging a contest, a player may have the option to give a particular work a prop which indicates that the judging player particularly liked the work 1228. Ideally, this would be limited to a certain number of times per day, such as, for example, five times per day. The creator of the work may receive in-game currency for the number of props that he or she receives from the contest. The judging player giving the prop may also receive a small amount of in-game currency for giving the prop.

Additionally, while judging, the player may be able to leave comments on the work and view any comments left by other players. Comments would be shown after the judging player has inputted his or her rating or vote. In one embodiment, a comment may only be left if the judging player gave the work a prop.

Additionally, while judging a contest, the player may be presented with the option to flag a particular work as obscene, junk or not English (or the relevant language of the game). A high enough number of flags may cause that work to be manually reviewed or automatically disqualified. Also, a very low average rating such as a 1.5 out of 5 after a certain number of ratings may cause the rating contest to be disqualified or end prematurely.

Additionally, the average rating that a player gives while judging contests is maintained in the database and if a player is giving too low or high of a rating on average then the player may be asked or required to remedy that.

After the period of time during which the contest is available for judging has concluded, the player is notified that the contest has finished the next time that player logs in. The player can then view the final results of the contest as well as the amount of experience points, in-game currency and other rewards that the player may have received for the contest.

Figure 14:
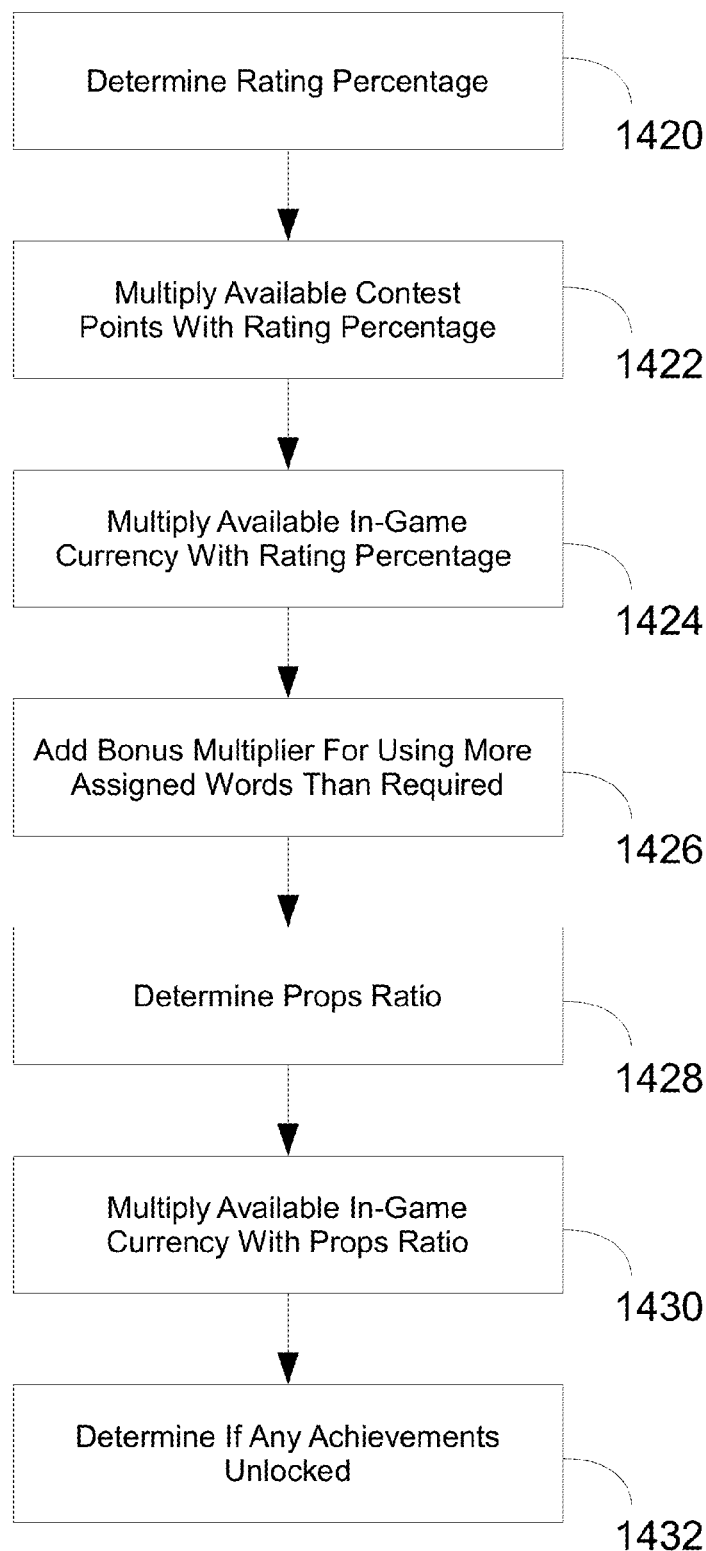
FIG. 14 is a flow chart that illustrates a method, in accordance with one embodiment of the present invention, of calculating the rewards that a player receives at the end of a contest.

Referring to FIG. 14, in one example of determining the rewards earned by a player at the conclusion of a rating contest, the numerical rating result could be divided by the maximum possible numerical rating result in order to yield a rating percentage between zero and one 1420. This rating percentage could be multiplied by the maximum available experience points that could be earned in that contest category to determine the amount of experience points that the player receives 1422. This rating percentage could also be multiplied by the maximum available in-game currency that could be earned in that contest category to determine the amount of in-game currency that the player receives 1424. Additionally, there may be a bonus multiplier for using more assigned words than were required of the player 1426. This could, for example, increase the amount of experience points and in-game currency earned by the player by 25% for each additional assigned word used. Additionally, any props received for the work could be divided by the total number of ratings for the work to determine a props ratio between zero and one 1428. This props ratio could be multiplied by the maximum available in-game currency to provide additional in-game currency to the player for the props the work received 1430. Then, it could be determined if any achievements were unlocked resulting from the contest, such as, for example, scoring a particularly high rating and if those achievements give the player any additional experience points or in-game currency rewards 1432.

In the case of a voting contest, the rating percentage could be a voting percentage that is determined by how many votes out of the total votes the player's work received and then multiplied by a voting factor. The voting factor is based at least partially on the number of works in the contest. For example, if there were only two works in a voting contest, the voting factor may simply be one and if a player's work received 70% of the total votes, then the voting percentage used to calculate the rewards would be 70%. However, the voting factor should increase if there are more than two works in the contest. For example, if there were five works in a voting contest, the voting factor should be higher since the player who got the most votes may still only get 25% of the votes in that five work contest.

Contest Categories

Each specific contest category would define the set of words or phrases from which the assigned words or phrases are drawn from. Additionally, each contest category would define what other materials are assigned and the set of those other assigned materials from which such assigned materials are drawn from.

The words or phrases and other materials may be randomly drawn from their respective sets. In one contest format, each individual word or other material within the set would have an equal chance at being randomly drawn. In another contest format, certain words or other materials within the set may be more likely to be drawn than others. However, in yet another contest format, there may be a schedule of which words or other materials are drawn so that there is no random selection involved.

Each particular contest category could also define the number of words or phrases to assign and the requisite number to be used by the player in the text(s). Typically, there will be two to five words or phrases assigned and the player is required to use at least one or two of them in the text(s). However, this could vary, particularly depending on what other materials are assigned and how challenging the contest category is intended to be.

Additionally, each particular contest category could also define the number of submissions a player must create before selecting one to enter in a contest. In one embodiment, this would typically be three submissions.

Contest categories can also differ in its judging process, such as whether contests comprise of one individual work to be rated in isolation or comprise of two or more works, all from that contest category, to be voted on.

It is also contemplated, that in certain contest formats, the player created written text may be converted into audio for the work. The judging players may then hear an audio version of the player created text along with or instead of the written form of the text. For example, the player may type in the text for song lyrics for a particular work and this may be converted into audio which would be played for the judging player.

Each contest category and its individual characteristics such as the word set it is drawing from, any additional materials to be assigned, its judging process, etc may be stored in a table in a database.

Each of the types of words and additional materials may also be stored in its own table in a database. For example, in one embodiment, there could be a table for "regular words", "combination words" and "theme words". Each table would contain all the words or phrases for that word type. Each word within the table may also be given a difficult rating and/or one or more themes attributed to that word. So then if a contest category is using as a word set of all the combination words of difficulty level two, then it would draw from the combination words table and draw from only those denoted as difficulty level two. Or if a contest category is using a word set of all the theme words with the theme of movies, then it would draw from the theme words table and draw only those denoted as a movie theme.

This may similarly be done with additional materials. For example, there may be a table of comic images and each image in the table may also have one or more themes attributed to it. So if a category were to assign a comic image, then it would draw one from the comic images table. If the category were to assign a comic image with the theme of "superhero comic", then it would only draw an image denoted as a "superhero comic" theme from the table. The same can be applied to other image types (such as photographs) as well as other additional materials such as moving images, sound pieces, lyrics, etc.

There may also be certain contest categories in which two or more players collaborate on a work 438. For example, the first player may begin a work in which the first player is assigned words and a comic panel image and would create the text for it. Then a second player, after viewing the completed first comic panel, may contribute to the work by using different assigned words in creating text for a second comic panel image that is next in sequence to the first comic panel image. Next in sequence means that the second comic panel image follows in a narrative sense to the first comic panel image, often comprising of some of the same characters, for instance. Then either the first player again or a new third player could similarly contribute to the work for a third comic panel image, which would be the next in sequence to the second one. When the work is completed, then the work is submitted to a contest to be judged by other players.

One objective of this collaboration would be to overcome the challenge of using the assigned words as well as of multiple players contributing to the same work in order to create a sensible and oftentimes funny comic panel arc. While the assigned words will typically be randomly assigned, the other assigned materials, such as the assigned comic panels for example, may be fixed and may even be a continuation of a previous completed work by the players.

The contest category would define how many sequences there are to the collaborative work. In the comic panel example, this would be how many comic panels there are to the work.

The contest category would define who the subsequent participants to the creation of the work are after the first player. Typically, these would be one of the player's friends. So for example, after the first player creates the first comic panel, that player could be asked to send a request to another friend (or multiple friends, in which case the first to respond would contribute) to create the second comic panel. After the second player completes the second comic panel, if there is a third comic panel to be completed, then it could either be by the first player or a third player whom is invited to participate by either the first or second players. Once submitted to a contest, all players will earn rewards from the contest although the first player may earn more than the others.

Location Based Contest Categories

A contest category may be a location based contest category 442. This means that the contest category can only be accessed from certain geographic locations. Typically, the set from which the assigned words or phrases are drawn from, as well as other materials such as images, moving images, audio pieces, inspiration words, other text or instructions are related to that geographic location.

Figure 17:
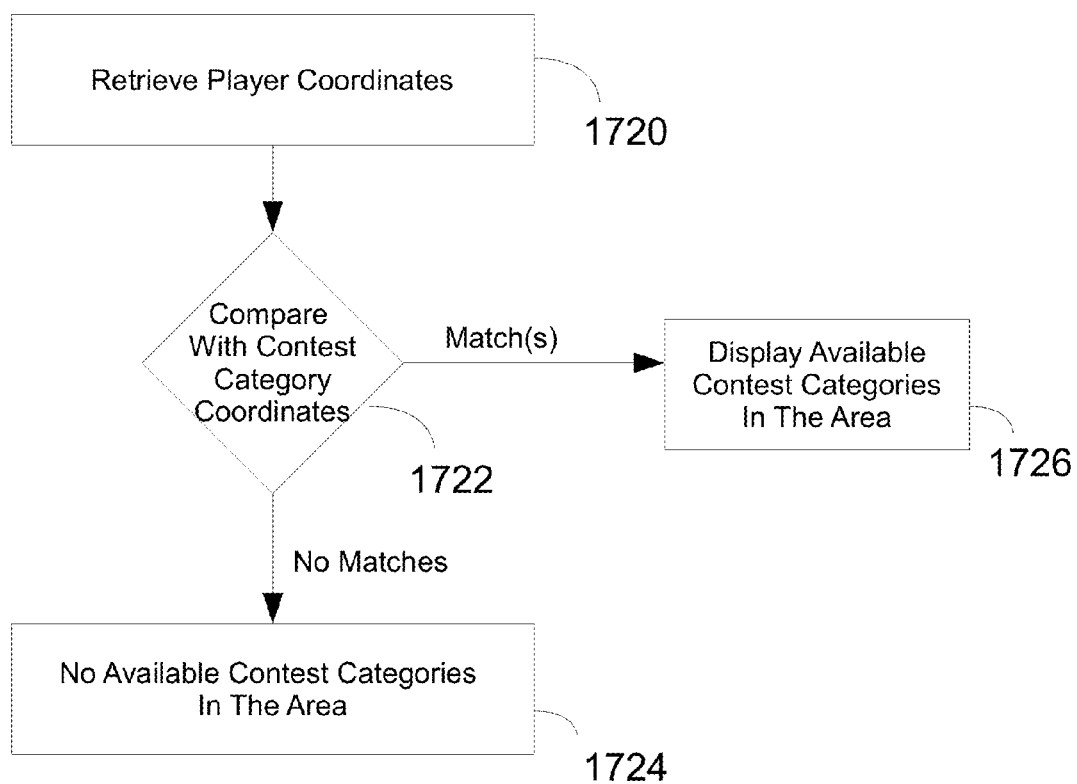
FIG. 17 is a flow chart that illustrates a method, in accordance with one embodiment of the present invention, of a player checking in to play a location based contest category.

Referring to FIG. 17, in one embodiment, this would require the player to be playing using an electronic client device which includes a location tracking function such as gps capability. Based on the player's physical location, if the player is within the coordinates defined by the contest format, the player can participate in the contest category. When a player is using an electronic client device with a compatible location tracking feature, then the player can select to check if there are any location based contest categories in the player's vicinity that the player can participate in. Each location based contest category would have defined coordinates of an area or multiple areas that the player must be accessing the game from in order to participate. The software would retrieve the physical coordinates of the player 1720 and compare that to those of the coordinate ranges of the location based contest categories 1722. If none are found, then the player is informed that there are no matching contest categories for that area 1724. If one or more are found, then those contest categories are displayed to the player for the player to select to participate in 1726. Participation in a location based contest category may include creating works and submitting to contests as well as judging contests.

In another embodiment, the player could have "checked in" to a physical location through an existing location based network such as, for example, a location based feature on FACEBOOK™ or FOURSQUARE™. A contest category could then require that the player have "checked in" to a particular location on such network in order to access the contest category.

For a location based contest category, the words or materials would typically be related to the physical location the player is playing from or checked into. For example, a contest category for a particular chain of stores may allow for players to enter a contest category for that chain of stores when a player is playing from the actual physical location within a store. The words and other materials may then be drawn from a set of words or other materials related to that store and the type of goods the store carries.

Since there will generally be fewer players playing in a location based contest category than in a non-location based contest category, the duration of location-based contests may likely be longer or even on-going.

Contest Access and Restrictions

While there may be a large variety of contest categories, there may be restrictions on how many and which ones a player may participate in. In one embodiment, a player may have only one active contest for each contest category. An active contest means that the contest is available to be judged by other players and is herein referred to as an "active contest".

Additionally, a player may be limited to a certain total number of active contests at any one time. This forces the player to choose to participate in the contest categories which are most meaningful to that player. Once a contest is over, then the player can view the contest results and thus close out that contest. The player can then enter in that contest category again or use that slot to enter in a different contest category. Herein, the number of active contests that a player may participate in at any one time will be referred to as "slots".

It should be noted that collaborative works may have their own slots, separate from the slots for single player creations. For example, in one embodiment, in addition to the normal single player creation slots, there may also be initiator collaboration slots and teammate collaboration slots. Every time a player begins a collaboration work, it occupies one of the player's initiator collaboration slots. The subsequent players who contribute to the work would then occupy one of their teammate collaboration slots.

The initiating player may, after a certain period of time, cancel a collaboration work in order to free up that slot again. This is allowed in case the player(s) invited to participate do not respond. Before a work is submitted to a contest, a subsequent player may opt out of the work, even after contributing, in order to free up his or her teammate slot. This does not retract the player's contribution but the player merely does not earn any rewards from the contest once the work is submitted. There is no way to cancel or opt out of a work once it is in a contest. In one embodiment, the number of initiator collaboration slots and teammate collaboration slots that a player has is the same as the number of normal slots that player has.

Additionally, in one embodiment, a player will not begin with access to all the contest categories. Instead the player would begin with access to the easier or more popular contest categories and progressively gain access to more contest categories as the player progresses in the game. As the player progresses in the game, there may be an automatic schedule of which contest categories are unlocked or the player may individually choose which contest categories to unlock. Player progression to unlock contest categories may include leveling up, spending in-game currency, achieving certain achievements, such as, for example, achieving a particularly high rating in a contest, or performing certain actions outside of the game. Typically, performing or having performed certain actions outside of the game to unlock a contest category would be related to the specific contest category unlocked. One example is to be a member of a certain organization or school in order to unlock a contest category in which the words or other materials are related to that organization or school.

In one embodiment, certain broader and more popular contest categories would be unlocked automatically as the player increases in level, other contest categories would need to be unlocked by the player by spending in-game currency to unlock them, and yet other contest categories may only be unlocked through achieving certain achievements within the game or performing or having performed certain actions outside the game.

Similarly, the total number of active contests a player may have at any one time (i.e. slots) may increase as the player increases in level, as the player spends in-game currency to purchase more slots, or achieves certain achievements within the game. In one embodiment, the player may automatically gain more slots as the player increases in level but would also have the opportunity to purchase additional slots by spending in-game currency and could also gain additional slots for reaching certain achievements. The additional slots may be either permanent or temporary, temporary being that the player may have the additional slot(s) for a certain period of time such as one week for example. In one embodiment, additional slots may only be purchased using the second in-game currency and is not available for purchase using the first in-game currency.

Words

In one embodiment, the different sets of words can be divided into the three primary categories of regular words, combination words and theme words. Note that, unless otherwise specified, a word is to be interpreted broadly as to include not just words found in a dictionary but also includes proper nouns and slang not found in a dictionary.

Regular words are individual words that can be found in a standard dictionary. Regular words can be further subdivided into different degrees of difficulty. In one embodiment, they are subdivided into three difficulty levels and there are a total of over 20,000 regular words. The difficulty of a particular word can be based on how commonly the word is used, how well known the definition of the word is, the scope or broadness of how the word can be used, the length of the word, and if it can be incorporated within a longer word.

Combination words are at least two words in which the words are each separated by a space from each other. Typically, they are common phrases or words often used sequentially together. In one embodiment, a combination word could contain up to a maximum of three individual words. Combination words can also be further subdivided into different degrees of difficulty. In one embodiment, they are subdivided into three difficulty levels and there are a total of over 10,000 combination words.

Theme words may be a single word or combination of words. In one embodiment, theme words, similarly to the maximum limit on combination words, could contain up to a maximum of three separate words although they can also be only one individual word. Theme words can include proper nouns such as the names of people, places, brands, organizations, etc or slang words not found in a dictionary.

Theme words can be subdivided into sets of words in which the words within the set contain some sort of commonality. Each set of words that share some sort of commonality will herein be referred to as a "theme". As can be imagined, theme words can be subdivided into many different themes. Examples of just a few possible themes include movies, politics, history, world related, current news, sports, fashion, urban slang, comics and video games.

The idea is to allow players to select the particular themes which are most familiar and meaningful to them. This would allow for higher quality works, since the players are likely to be more familiar with the theme, and also would make more knowledgeable and interested judges of the contests.

Themes may be targeted to only a segment of the playing population. For example, there may be a theme of a geographical locality such as New York, in which the theme is New York related words and the ideal player would be familiar with New York so that the words are meaningful to that player.

Themes may also be related to current hot topics and issues in which the words are related to current news, events, holidays, media and other such current topics of interest. The words within that theme set could then be updated regularly to maintain pace with the changing world. An example of how this could be used would be a word set theme of current political topics combined with a comic panel image. This example allows and encourages players to express themselves in the creation of a political cartoon, within the structure and guidance of the game format. Themes may also be connected with organizations, brands or other real world institutions or groups and draw from a set of words related to the aforementioned.

Additionally, players may be able to create their own themes and sets of words for others to draw from and use, essentially creating their own unique contest category. This has a special community and engagement value because it enables a player to build off the shared culture of a particular group that the player is familiar with and whom are targeted in the creation of the theme.

There are also potential productive uses for this feature. One example is for educational purposes such as where a theme is tied to a particular course and is created by the instructor for students to play and the word set consists of key words, names or phrases from the course.

Referring to FIG. 15, a player creating a theme could do so by entering a description of the theme of the word set 1520 and specifying whether the theme is intended to be publicly available to all players or private and by invite only 1521. The player would then define the set of words by inputting words 1522 and adding them to the set 1524. The words currently in the word set would be listed 1526 and a player may select a word in the word set and remove it from the word set 1528. There could be a required minimum number of words to be entered into the set, such as fifty for example 1530, as well as a maximum, such as two hundred fifty for example 1532. This feature may also allow for more than one player to collaborate on defining the word set.

Additionally, it is contemplated that players may also be able to define additional materials to be included in the contest format such as inspiration words, images, moving images, audio pieces, other text and instructions. Players may also be able to define other aspects of the contest format such as the contest length of time, how many words are assigned and how many are required to be used. Since there will generally be fewer players playing in a player created contest category, the duration of these contests will typically be longer or even on-going.

In order to limit the number of player created themes that are available so as not to deluge other players with an overwhelming number as well as ensuring a higher quality of themes, there may be some requirement such as being a certain level within the game, or it may cost a certain amount of in-game currency to create a theme. In one embodiment, such player created themes may only be purchased using the second in-game currency and is not available for purchase using the first in-game currency.

If the player created theme is designated as public, then the theme may then be available to be played by others in a section designated for player created themes 440. In one embodiment, there may be no rewards given for player created contest categories in order to limit potential fraudulent activity. However, if a certain number of players participate in a player created contest category, the creator of may be rewarded with experience points, in-game currency or some other reward.

Another possibility for a theme is a dynamic theme in which the specific parameters involved in creating the work are determined based on specific information relating to individual player(s) according to some predetermined method or algorithm 444. An example would be an algorithm that retrieves relevant texts associated to that player and then draws words from such texts. While each individual player participating in the contest format would have different texts and thus different sets of words to draw from, the same method or algorithm would apply for each player consistent with the contest format.

Figure 16:
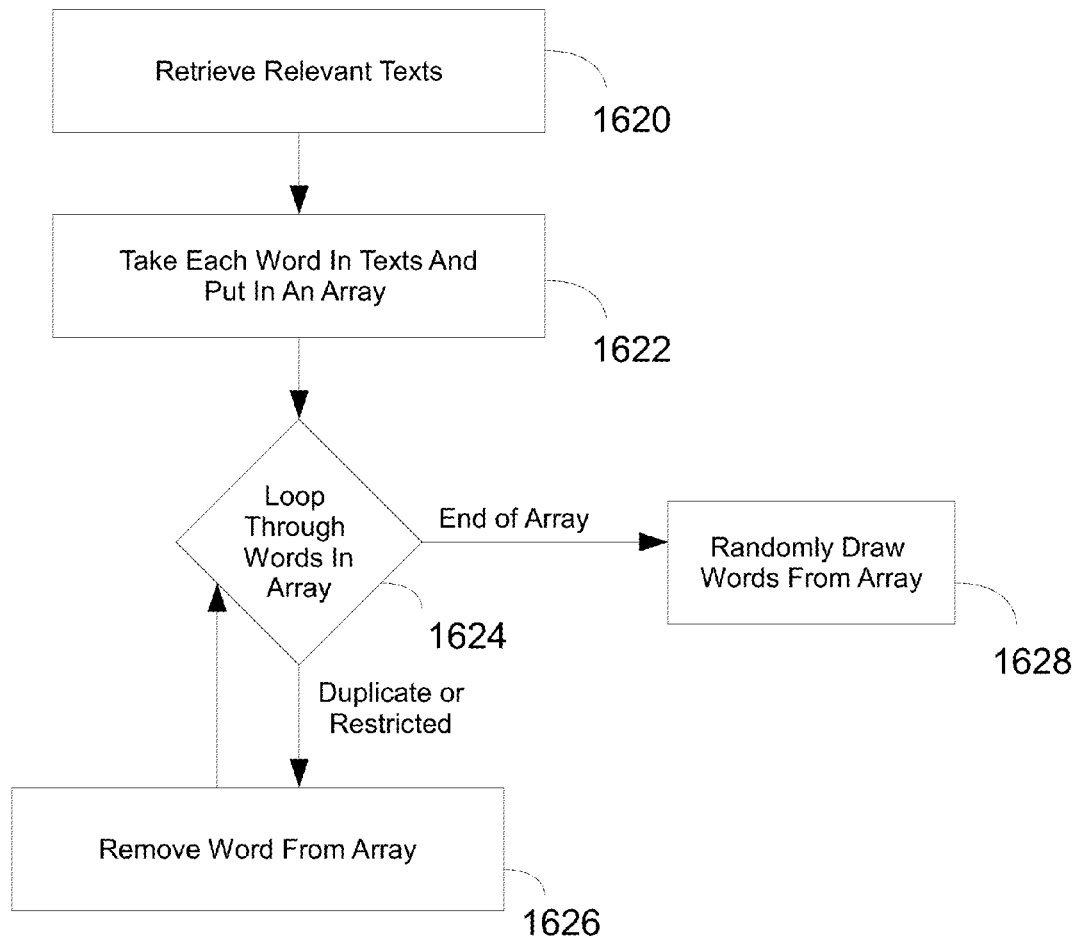
FIG. 16 is a flow chart that illustrates a method, in accordance with one embodiment of the present invention, in which the set of words to be drawn from is generated based on variables specific to a player.

Referring to FIG. 16, when a player enters a dynamic contest category, then the relevant texts associated to that player would be retrieved 1620. In one embodiment in which the player is playing through a social network with a newsfeed of status updates such as FACEBOOK™, an example of the relevant texts could be ten of the player's friends' status messages randomly selected from the most recent one hundred status messages of the player's friends. The software would take each word in the texts and place it in an array 1622 and then loop through that array 1624. Each word would be removed if it is a duplicate word or if it matches with a restricted word list 1626. The restricted word list would typically consist of short or common words such as, for example, "there", "that" or "what" as well as objectionable or offensive words. Additionally, the restricted list could include any words that are three characters or less or contain any non alphabet symbols. Then, when the end of the array is reached, the words are randomly drawn from that array and assigned to the player 1628. The player's friend's name whose status message the word was drawn from may also be displayed to the player. Additionally, other materials such as photos on a social network account for example, may also be retrieved and assigned in the creation of a work for a dynamic contest category.

As can be appreciated from the foregoing, there can be a large variety of themes and different categorizations of words and phrases and this disclosure is not limited to the examples given.

Legal Usages of Words

Referring to FIG. 18, the game could allow for certain variations of an assigned word to count as using the assigned word. This can add more complexity and strategy to the creation of a work.

In one embodiment, the player could use an assigned word if it is contained within a longer word, so long as the original word remains the same. So for example, if the given word is "race" 1820 then some legal usages of that word include "disgrace" 1822 and "racers" 1824 since "race" is contained within both overarching words. Note that the extended word does not have to be semantically connected with the original word, as is the case for extending "race" into "disgrace". The delineator for a word is a space present at the beginning and end of the word or a beginning of text or end of text delimiter if the word is at the beginning or end of the text.

If the given word is a combination word consisting of more than one individual word, such as "hard drive", then the aforementioned rule could also apply to each of the individual words within the combination word. So for example, if the given word is "hard drive" 1830, then "shard drive" 1832, "hard drivel" 1834 or "shard drivel" 1836 would all be legal usages of "hard drive". In addition, the individual words could be combined into one word without the space so that "harddrive" 1838 would be a legal use of "hard drive". Legal allowances of extending the word would also apply if the word were combined so the word "sharddrivel" 1840 would be a legal usage of "hard drive". Note that while these examples given are legal usages of "hard drive", they would probably not receive a high rating since they are not real words, unless the player were to somehow use them in a very creative and meaningful way.

The game can also contain logic that allows certain permutations of the given word as a legal use of the word even though the exact word, as given, is not used. For example, if the word is "race", then the game logic could allow permutations of the word such as "racing" 1826 or "racy". The logic would be based on an algorithm specific to the language being used (such as the English language in this case) to allow various common grammatical forms for the given word. In one embodiment, words assigned will generally be the base word in the language such as "race", as opposed to "racing" or "raced", and thus the grammar algorithm makes the assumption that the word is a base word. However, more specific forms of a word could still be assigned in order to provide a greater challenge to the player.

Additionally, the aforementioned rule which allows extensions of an assigned word could also apply to a legal permutation of an assigned word as well. So if the assigned word was "race", and "racing" was a legal permutation, then "disgracing" would also be a legal usage since "racing" is contained within "disgracing" 1828. The rule also applies to combination words such as if the assigned word was "hard drive" and "driving" was a legal permutation of "drive" then "harder driving" for example would be a legal usage 1842.

Inspiration Words

In addition to words or phrases that are assigned to the player to be used in the creation of the text, there may also be one or more inspiration words assigned to guide the player in the creation of the text. This inspiration word could be a regular word, combination word or theme word, depending on the contest format. The inspiration word is not required to be explicitly used within the text but rather, to help guide and "inspire" the player in the creation of the text. The inspiration word would be shown to players judging the work so that it becomes important to use the inspiration word in some way in order to show to judging players the connection between the work and the inspiration word.

Additionally, there may be an inspiration word of the day for certain contest categories. Every player creating a work that day in that category would be assigned the same inspiration word.

Images and Moving Images

One or more images or moving images may be assigned to the work. Typically, the text(s) to be created by the player would be related to any images or moving images assigned. The image(s) or moving image(s) could be drawn from a set of images or moving images that is defined by the contest category.

Typically, the image is of a type in which there is at least one area of text that is associated with the image so that the player created text is used in that area. Examples of the type of images that could be used include comic panels which contain text bubbles or text boxes, an interesting newsworthy photograph that could be used in conjunction with space for a headline and abstract text, or an advertising type image or photograph that that contains space for text and could be used to create a print ad. The length of the player created text(s) could be limited based on size of the space for the text in connection with the image.

Multiple images may be assigned and used. For example, several comic panels that depict a continuous scene may be assigned and used. The player could create text for all the text bubbles in the comic panels using the requisite number of assigned words or it could be a collaborative effort among two or more players. As described earlier, this collaborative effort could be done asynchronously where the first player completes the first comic panel with his or her assigned words and then the second player views the completed first comic panel and completes the second comic panel with his or her assigned words and so on. In another embodiment, the individual pieces may be created independently of each other and then combined into a work. In yet another embodiment, the players may collaborate in real time to create the work.

Additionally, one or more moving images could be assigned to the player. Similar to images, text could be associated with certain frames of the moving image and the player could create the text for such moving image using the requisite number of assigned words.

It is also contemplated that the images or moving images may be selected by the player instead of being assigned to the player or there may be multiple images or moving images assigned and the player selects which one(s) to use. Additionally, the images or moving images may be altered or customized by the player, such as, for example, by changing the colors within the comic panel, manipulating the location or shape of the text bubbles in the comic panel, adjusting the dimensions of the print ad graphic or manipulating the ordering of the frames in the moving image.

Audio Pieces

One or more audio pieces may be assigned to the work. The audio piece(s) would be played for the player creating the text. The audio piece(s) would also be played for the judging player. Typically, the text(s) to be created by the player would be related to any audio piece assigned. The audio piece, for example, could be music or spoken word associated with the player created text(s). The audio piece could also be in conjunction with a moving image.

Additionally, audio pieces may be created for the work by the software by converting any player created written text into audio. This audio could then be played for the judging player along with or in lieu of the written text.

Other Text

There may also be other text which is already written out that may be assigned to the player. For example, the player may be given the first stanza of rap lyrics and asked to create a second stanza, using the requisite number of assigned words, but also following the style and rhyme structure of the first stanza. The judging player would be shown the other text assigned, such as in this example, the first stanza.

Instructions

There may also be instructions that may be given relating to the form that the text(s) should take. For example, the instructions could instruct the player to create a haiku poem using a requisite number of the assigned words. As the player created the text, the text could also then be formatted in accordance with the haiku format such as limiting the number of characters or words per line and restricting the text to three lines, in the case of a three line haiku.

Instructions could also be given relating to the aim of the text to be created by the player. For example, instructions could direct the player to use the assigned words in creating something for political humor, a tragedy or a soap opera drama.

The judging player would be shown any instructions. Typically, for any particular contest format, the same instructions would be given to all players in order to maintain parity in format of the work.

Social Aspects

One embodiment intends for a player's account to be linked to some of the player's friends, relatives and other acquaintances, herein referred to as "friends". The game could be played using an account from a social network, in which the player has existing connections to friends. The game could be played directly through the social networking site or off site and using the player's social network account in order to access the player's friends list and any other relevant information from the social network.

The player may view and follow the player's friends' actions and results within the game as well as collaborate with those friends in the creation of a work. Each player may view a friend's gallery as well as the friend's current, active contests. Viewing an active contest would only be to view the contest and not actually involve judging that particular contest. However, it is contemplated that viewing a friend's active contest may elicit some reward, such as in-game currency, and this could serve as additional motivation for the player to be more socially active in the game. Additionally, the friend whose contest was viewed may get a reward as well. This could be capped at a maximum amount per day.

There may also be an option for a player to invest in a friend's work which is in an active contest. So for example, the player may invest a certain amount of in-game currency in that friend's work and then when the contest concludes, the player would receive in-game currency based on the results of the contest. This investing feature would preferably be available only in the beginning period of a contest.

Each player could have his or her own gallery. The game may allow for works that were part of a contest that has since concluded to be available in the gallery. The gallery is intended to be accessed and viewed by the player and that player's friends and other players. In one embodiment, each player would have a limited number of gallery spaces, such as ten. The player can then choose and customize which works to assign a gallery space from a gallery customization screen. When viewing another player's gallery, only the works assigned a gallery space would be available to be viewed. Additionally, the player may acquire more gallery spaces, through increasing in level, spending in-game currency or accomplishing other achievements or tasks in the game. In one embodiment, additional gallery spaces may only be purchased using the second in-game currency and is not available for purchase using the first in-game currency.

Additionally, in one embodiment, once a contest is over, only works that have achieved a certain minimum rating or contest result, such as a 3.5 out of 5 rating or getting the most votes, would be available to be placed in the gallery. This would make customizing a player's gallery easier since a player who has played over a long period of time may have amassed a very large number of works that could become overwhelming and unmanageable.

A player may also be able to customize the design and look of his or her gallery. This could be done through purchasing using in-game currency (some of which may only be available using the second in-game currency) or otherwise acquiring such items and design features. Similarly, the player may have an avatar which could be displayed in the player's gallery and which the player could customize in terms of appearance and function. Additionally, friends of the player may be able to leave comments on the player's gallery.

A player could also have a profile page that may display the player's various game statistics, achievements and current contests. In one embodiment, the profile page may be a distinct and separate page that friends and other players could go to in order to view that player's profile. In another embodiment, the profile page could be incorporated into the gallery.

While judging a contest, a player may have the option to become a fan of the creator of a particular work. This could be limited to a certain number of times per day, such as five for example, that a player can become a fan of another player in order to increase the significance of the action. Becoming a fan could mean that the creator and fan are linked in a database so there is a creator-fan relationship between the two. The fan could then view the creator's gallery and active contests and the creator can see whom are that creator's fans. The creator may also receive some reward, such as in-game currency or certain achievements, for attaining fans.

A player may be able to challenge a friend directly to a voting contest in which they each create a work from the same contest category and the works are put up against each other for voting by other players, herein referred to as a "challenge contest". In order to create the challenge contest, each player may first need to participate in voting on a certain number of other challenge contests. Also, in order to challenge a friend, it may require the challenging player to use a challenge card, which is an item in the game that may be acquired by purchasing one using in-game currency and also as a reward that is awarded randomly sometimes while a player is judging works or gifted from another player.

Additionally, after a player submits a work to a contest, it is contemplated that the player may be able to invite another friend or player to create his or her own work under the same conditions (such as the same assigned words and images for example).

Additionally, there may be the option after creating a work or while viewing or judging another player's work, for the created work to be downloaded or shared such as, for example, via email, posting on a wall, newsfeed or some other format within a social network, or broadcast or transmitted to others in some other way.

Additionally, there may be tournaments or contests structured, in either rating, voting or another judging format, in which the winner or top place finishers can win rewards in the game or real world prizes.

Additionally, there may be a section in the game that could list the top rated or voted works from the recent past as well as a leaderboard section based on certain statistics such as highest average rating, or a listing of the top rated works for a particular contest category. In one embodiment, there could be a section called something similar to a daily newspaper, in which it would feature the highest rated works from the previous day and past 7 days for certain contest categories. This publicity feature would provide more incentive for players to put more thought into creating higher quality works in order to achieve a higher rating or better contest result and be featured in the newspaper. There may also be achievements or other in-game rewards awarded to a player for appearing on the leaderboard or newspaper.

Freestyle Images

Another aspect of the game is to have images that the player can acquire either through in-game currency, won from contests or some other method which are then located in the player's inventory. In one embodiment, these images may be drawn randomly from a set of images, such as comic panels for example, and such randomly drawn images may be acquired in exchange for in-game currency. There may be certain types of freestyle images that may only be purchased using the second in-game currency and is not available for purchase using the first in-game currency.

These images, herein called "freestyle images", are similar to images that may be part of a contest format except they can be used by the player at any time to create a new work and is not limited by a word restriction. The creation is herein referred to as a "freestyle work". These works would not be entered in a contest but are saved in a database and placed in a freestyle gallery that is similar to the regular gallery except it features only freestyle works. Similar to a regular gallery, there may be a limited number of freestyle gallery spaces and the freestyle gallery may be customized by the player.

The freestyle images can further be assigned different levels of rarity which influence the probability of drawing a particular freestyle image, the more rare having a less probability of being drawn. Note that the concept of freestyle images may also be applied to other materials as well such as moving images or audio pieces.

Scope

The present invention has been described in relation to particular examples, which are intended in all respects to be illustrative rather than restrictive. Examples given have been for the English language but it will be apparent that this game can be played in other languages as well.

Those skilled in the art will appreciate that many different contest formats, such as relating to different types and sets of words, images, moving images, other visual media, audio pieces, other text, and instructions that may be assigned for creation of the work, will be suitable for inclusion in the present invention. There can also be many different menu schemes and ways of organizing the different contest categories and formats. While the game has been described in terms of a word game, there may be contest categories in which no words are assigned and only other materials such as symbols, graphics or images would be assigned and required to be incorporated into the creation of a work.

Additionally, those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method of conducting a word game using one or a plurality of electronic devices, each electronic device having a processor, a display, and an input device, the method including the following steps:

assigning, via at least one processor, one or a plurality of words or phrases to a first player set, the first player set including one or more players;

assigning, via the at least one processor, one or a plurality of images to the first player set;

displaying, via at least one display, said assigned at least one word or phrase and said at least one image to the first player set;

allowing, via at least one input device, at least one player from the first player set to generate one or a plurality of texts in relation to said at least one assigned word or phrases and said at least one assigned images in which said generated texts are displayed, via the at least one display, proximate to and in a section of said at least one assigned image, which constitutes a created work;

displaying, via at least one display, said created work to a second player set, the second player set includes one or more players and the second player set is unique from the first player set; and allowing, via at least one input device, at least one player from the second player set to input judgment on said created work.

2. The method of claim 1, wherein one or a plurality of said electronic devices are connected to a communications network.

3. The method of claim 2, wherein each player of said word game has a persistent account whereby to maintain player related information and the persistent accounts are stored in one or a plurality of databases connected to said communications network.

4. The method of claim 1, wherein said created work is available to be judged by other players for a limited period of time.

5. The method of claim 1, wherein said player or players of the first player set receive one or a plurality of rewards or benefits, determined, at least in part, based on said judgments of the second players.

6. The method of claim 1, wherein said judgment of said created work is given using a rating scale.

7. The method of claim 1, wherein said judgment of said created work is given by placing said work in connection with one or a plurality of other works created by one or a plurality of other players and attributing which work or works the second player set prefer.

8. The method of dam 1, wherein said first player set are required to judge a certain number of works created by other players before said first player set can submit said created work to be judged by said second player set.

9. The method of claim 1, wherein said assigned words or phrases are drawn from a larger set of words or phrases.

10. The method of claim 9, wherein said first player set either select or are assigned a category to participate in and said set of words or phrases is defined by said category.

11. The method of claim 9, wherein said set of words or phrases may have a corresponding level of difficulty or theme associated with each of the words or phrases contained within said set of words or phrases.

12. The method of claim 9, wherein said defined set of words or phrases from which to draw said assigned words or phrases is defined based on information specific to a particular player or players.

13. The method of claim 9, wherein one or a plurality of players can define said set of words or phrases to be drawn from and to be contained in the text or texts of works created by other players.

14. The method of claim 1, wherein said first player set may use certain allowed variations of an assigned word or phrase to count as using said assigned word or phrase in said text or texts.

15. The method of claim 1, wherein said generated text or texts are required to contain said assigned words or phrases within said text or texts.

16. The method of claim 1, wherein said first player set is also assigned one or a plurality of audio pieces that are associated with said text or texts to be created by said player or players for said created work.

17. The method of claim 9, wherein said category is related to the physical location that said player or players are playing said word game from.

18. An apparatus for conducting a word game, comprising:
an input device for receiving game play input;
a display device for displaying game play output; and
a processor configured to perform the following:
assigning one or a plurality of words or phrases to a first player set, the first player set including one or more players;
assigning one or a plurality of images to the first player set;
displaying, via the display device, said assigned at least one word or phrase and said at least one image to the first player set;
allowing, via the input device, at least one player from the first player set to generate one or a plurality of texts in relation to said at least one assigned word or phrases and said at least one assigned images in which said generated texts are displayed, via the display device, proximate to and in a section of said at least one assigned image, which constitutes a created work;
displaying, via the display device, said created work to a second player set, the second player set includes one or more players and the second player set is unique from the first player set; and
allowing, via the input device, at least one player from the second player set to input judgment on said created work.

* * * * *